(12) United States Patent
Shinobudani et al.

(10) Patent No.: US 6,640,696 B2
(45) Date of Patent: Nov. 4, 2003

(54) DEVICE AND METHOD FOR CONTINUOUS HIGH-PRESSURE TREATMENT

(75) Inventors: Koji Shinobudani, Hiroshima (JP); Tetsuo Shinomiya, Hiroshima (JP); Mitsuo Nagai, Hiroshima (JP); Nobuhiro Haramoto, Hiroshima (JP); Hiroshi Miyahara, Hiroshima (JP); Toshiyuki Ninomiya, Hiroshima (JP); Yasuharu Nosho, Hyogo (JP); Shinichi Hashimoto, Hyogo (JP); Masakazu Kato, Hyogo (JP); Kazuhiro Ueshima, Hyogo (JP)

(73) Assignees: The Japan Steel Works, Ltd., Toyko (JP); Kaneka Corporation, Osaka (JP)

( * ) Notice: Subject to any disclaimer, the term of this patent is extended or adjusted under 35 U.S.C. 154(b) by 0 days.

(21) Appl. No.: 10/203,413
(22) PCT Filed: Feb. 16, 2001
(86) PCT No.: PCT/JP01/01129
§ 371 (c)(1), (2), (4) Date: Aug. 9, 2002
(87) PCT Pub. No.: WO01/60508
PCT Pub. Date: Aug. 23, 2001

(65) Prior Publication Data
US 2003/0010295 A1 Jan. 16, 2003

(30) Foreign Application Priority Data
Feb. 17, 2000 (JP) .................................. 2000-039327
Jan. 29, 2001 (JP) .................................. 2001-020505
Jan. 29, 2001 (JP) .................................. 2001-020526

(51) Int. Cl.[7] .............................................. A23L 1/00
(52) U.S. Cl. ...................................................... 99/467
(58) Field of Search ......................... 119/57.92; 99/467, 99/468, 470; 426/665

(56) References Cited

U.S. PATENT DOCUMENTS

| | | | | |
|---|---|---|---|---|
| 3,615,668 A | * | 10/1971 | Smith, Jr. | 426/467 |
| 3,818,818 A | * | 6/1974 | Hice, Sr. | 99/330 |
| 3,823,662 A | * | 7/1974 | Smith, Jr. | 99/468 |
| 5,213,029 A | * | 5/1993 | Yutaka | 99/474 |
| 5,996,478 A | * | 12/1999 | Schuman et al. | 99/453 |
| 2001/0041206 A1 | * | 11/2001 | Raghavan et al. | 426/523 |

* cited by examiner

Primary Examiner—Yvonne Abbott
(74) Attorney, Agent, or Firm—Sughrue Mion, PLLC

(57) ABSTRACT

A device and a method for continuous high-pressure treatment; the method, comprising the steps of increasing the pressure of raw materials (25) in a feed tank (9) by a pressurizing pump (1) so as to continuously feed the raw material to treatment containers (6) and (6a) and increasing the flow rate of the pressurizing pump (1) over that of a depressurizing pump (2) or continuously exhausting the raw material from the treatment containers (6) and (6a) through a pressure regulating flow path resistance (59) while depressurizing; the device, comprising pressure releasing bypass circuits (55) disposed in the flow path resistance (59) in parallel with each other, wherein the insides of the treatment containers (6) and (6a) are kept in a specified high-pressure state during the continuous processing.

37 Claims, 12 Drawing Sheets

DEVICE AND METHOD FOR CONTINUOUS HIGH-PRESSURE TREATMENT

FIELD OF THE INVENTION

The present invention relates to a continuous high-pressure processing method and apparatus. More particularly, the present invention relates to a novel improvement in a method and apparatus for continuously processing, under high pressure, a liquid feedstock having a relatively high viscosity, such as foods, pharmaceuticals and cosmetics made up of oil-and-fat compositions, etc.

BACKGROUND OF THE INVENTION

Such a high-pressure processing method has so far been practiced by batch processing, continuous processing using a throttle, continuous processing using a long or thin pipe to generate flow resistance. The continuous processing method using a throttle will be described below with reference to FIG. 13. FIG. 13 is a block diagram showing one example of conventional continuous high-pressure processing apparatus. In FIG. 13, the continuous high-pressure processing apparatus comprises a supply tank 9, a pressurizing pump 1, a processing container 6 provided with a built-in agitator, and a throttle 30, which are arranged successively in this order from the upstream end and are interconnected by pipes (piping) 5. A pressure gauge 2 and a safety valve 12 are disposed in the pipe 5 between the pressurizing pump 1 and the processing container 6. Further, a ripening apparatus 14 is disposed at the downstream end of the continuous high-pressure processing apparatus, i.e., downstream of the throttle 30.

In the continuous high-pressure processing apparatus having the above-described construction, a feedstock (comprising plural kinds of raw materials) 25 is introduced to the supply tank 9 where the raw materials are mixed under agitation for homogenization. The feedstock 25 in the supply tank 9 is sucked by the pressurizing pump 1 and delivered to the processing container 6 under pressure. In the processing container 6, the feedstock 25 is agitated while being maintained in the state pressurized to a predetermined level of high pressure, whereby the feedstock is subjected to processing such as sterilization and pressure crystallization. The feedstock 25 resides in the processing container 6 for a predetermined period of time so that it is uniformly processed under high pressure, and is then continuously discharged into the ripening apparatus 14 through the throttle 30. The pressure in the processing container 6 is maintained by both the pressurizing pump 1 and the throttle 30 for throttling a flow in the pipe 5 downstream of the processing container 6, and its measured value is indicated by the pressure gauge 2. The pressure in the processing container 6 and the residing time of the feedstock 25 are maintained at respective predetermined values by adjustably controlling the opening degree of the throttle 30, the rotational speed of the pressurizing pump 1, or both of them at the same time. If the pressure in the piping between the pressurizing pump 1 and the throttle 20 is increased to an abnormal level, the safety valve 12 is operated to release an abnormally excessive pressure.

The conventional processing methods mentioned above have problems as follows.

The batch processing has low productivity, has poor efficiency, and is difficult to implement as processing in an enclosed system.

Also, the batch processing entails works to be carried out in a manner open to the environment, and therefore has a difficulty in hygienic management in manufacture of foods and pharmaceuticals.

In the continuous processing method employing a throttle to hold the high-pressure state, a large amount of shearing energy is produced in a portion where a flow is throttled, thus causing dispersion of a flowing material under processing, which leads to destruction and change of components of the flowing material. As a result, liquid products obtained by the high-pressure processing are often no longer usable.

Further, in the continuous processing method using a thin or long pipe to produce flow resistance, when physical properties (compositions) of a flowing material (semi-liquid material) are changeable, it is difficult to make control so as to achieve a target pressure because viscosity is greatly changed depending on temperature changes. This method is also impractical in that a flow passage is clogged upon a slight change in components of the liquid material or operating conditions.

Another problem is that since driving power of a high-pressure pump, i.e., high-pressure flow energy, is changed into velocity energy at the throttle or thermal energy due to line resistance, greater driving power is required and hence the operating cost is increased.

With the view of overcoming the above-described problems in the state of the art, it is an object of the present invention to provide a continuous high-pressure processing method and apparatus, which are able to continuously perform high-pressure processing of a liquid feedstock with stability.

DISCLOSURE OF THE INVENTION

To achieve the above object, according to one aspect of the present invention, a continuous high-pressure processing method comprises the steps of supplying a feedstock continuously from a supply tank to a processing container through a pressurizing pump; discharging the processed feedstock from the processing container through a depressurizing pump disposed in piping; and setting a first delivery rate of the pressurizing pump to be larger than a second delivery rate of the depressurizing pump, whereby the interiors of the processing container and the piping are maintained in a high-pressure state.

Preferably, the method further comprises the step of coupling drive shafts of the pressurizing pump and the depressurizing pump to each other in a mechanically or electrically controllable manner.

Preferably, the method further comprises the steps of connecting the pressurizing pump and the depressurizing pump to a main drive motor and a driving distributor, providing a speed regulator in one downstream branch from the driving distributor, and setting a first driving speed of the pressurizing pump to be higher than a second driving speed of the depressurizing pump.

Preferably, the method further comprises the steps of connecting the pressurizing pump and the depressurizing pump to a main drive motor and a driving distributor, providing an auxiliary pressurizing pump, which has a smaller delivery rate than the pressurizing pump, in parallel to the pressurizing pump, and connecting a delivery portion of the auxiliary pressurizing pump to the outlet side of the pressurizing pump.

Preferably, the method further comprises the steps of connecting the pressurizing pump and the depressurizing pump to one main drive motor in series, providing an auxiliary pressurizing pump, which has a smaller delivery rate than the pressurizing pump, in association with the pressurizing pump, and connecting a delivery portion of the auxiliary pressurizing pump to the outlet side of the pressurizing pump.

Preferably, the method further comprises the steps of attaching a pressure sensor to the piping, and controlling the high-pressure state in accordance with a pressure signal from the pressure sensor.

Preferably, the method further comprises the steps of connecting the pressurizing pump and the depressurizing pump to one main drive motor through a driving distributor, and constituting any of the pressurizing pump and the depressurizing pump to be of the variable displacement type.

Preferably, the method further comprises the steps of connecting the pressurizing pump to one main drive motor through a driving distributor, connecting any of the depressurizing pump and the pressurizing pump to the driving distributor through a gear box, and setting a gear ratio of the gear box such that delivery rates of both the pumps are in match with each other.

Preferably, the method further comprises the steps of driving the pressurizing pump by a main drive motor, driving the depressurizing pump by a second motor independent of the main drive motor, and supplying power from the second motor, as electrical energy, to the main drive motor.

Preferably, the method further comprises the step of heating or cooling the processing container.

Preferably, in the method, the feedstock is any of foods and pharmaceuticals.

Also, a continuous high-pressure processing apparatus comprises a pressurizing pump for supplying a feedstock continuously from a supply tank to a processing container; a depressurizing pump disposed in piping downstream of the processing container; and a control unit for controlling delivery rates of both the pumps, the control unit controlling a first delivery rate of the pressurizing pump to be larger than a second delivery rate of the depressurizing pump.

Preferably, the control means comprises a driving distributor connected between both the pumps and a main drive motor, and a speed regulating motor connected to the driving distributor.

Preferably, the control means comprises a driving distributor connected between the pressurizing pump and a main drive motor, the depressurizing pump being connected to the driving distributor, and an auxiliary pressurizing pump connected in parallel to the pressurizing pump and having a smaller delivery rate than the pressurizing pump, a delivery portion of the auxiliary pressurizing pump being connected to the outlet side of the pressurizing pump.

Preferably, the pressurizing pump and the depressurizing pump are connected in series to the main drive motor, and the control means comprises an auxiliary pressurizing pump connected in parallel to the pressurizing pump, a delivery portion of the auxiliary pressurizing pump being connected to the outlet side of the pressurizing pump.

Preferably, the control means comprises a driving distributor for connecting the pressurizing pump and the depressurizing pump to a main drive motor, any of the pumps being of the variable displacement type.

Preferably, the control means comprises a second motor for driving the depressurizing pump, the second motor being independent of a main drive motor for driving the pressurizing pump, and a control line for supplying power from the second motor, as electrical energy, to the main drive motor.

Preferably, the processing container includes a heating unit and/or a cooling unit.

Preferably, the apparatus further comprises a pressure sensor attached to the piping.

Further, the method preferably further comprises the steps of attaching a plurality of pressure sensors to the piping, and employing a pressure signal from any of the pressure sensors.

Preferably, the method further comprises the steps of driving the pressurizing pump by a main drive motor, driving the depressurizing pump by a second motor independent of the main drive motor, and recovering power from the second motor as electrical energy or saving the power for economy of energy.

Preferably, the method further comprises the step of providing a throttle valve and/or a line resistance in part of the piping, thereby reducing a load imposed on the depressurizing pump.

Still further, in the apparatus, the control means preferably comprises a second motor for driving the depressurizing pump, the second motor being independent of a main drive motor for driving the pressurizing pump, and a control line and an amplifier for recovering power from the second motor as electrical energy or saving the power for economy of energy.

According to a second aspect of the present invention, a continuous high-pressure processing method comprises the steps of pressurizing a feedstock in a supply tank by a pressurizing pump and supplying the feedstock continuously to a processing container; discharging the processed feedstock continuously from the processing container through a flow resistance under depressurization, the flow resistance being able to adjust pressure; and providing a pressure-release bypassing circuit in parallel to the flow resistance, whereby the interior of the processing container is maintained in a state under a predetermined high pressure for continuous processing therein.

Preferably, the method further comprises the step of adjusting a temperature of the processing container to heat or cool the feedstock in the processing container.

Preferably, the method further comprises the step of cooling the processed feedstock in a cooling container downstream of the flow resistance.

Preferably, the method further comprises the steps of providing a plurality of processing containers connected to each other in series, and providing the flow resistance and the pressure-release bypassing circuit between the processing containers, whereby the interiors of the processing containers are maintained in states under high pressures changing step by step.

Preferably, the method further comprises the steps of providing the flow resistance in the form of a line designed to have a specific pipe length and/or pipe diameter, and switching on/off a plurality of valves disposed in the line to change the length of the line for changing a resistance value, whereby the interior of the processing container is maintained in a state under the predetermined high pressure.

Preferably, in the method, the flow resistance is constituted as a throttle valve.

Preferably, the method further comprises the step of controlling a resistance value of the flow resistance in accordance with a pressure signal from a pressure sensor attached to the processing container or a piping connected to the processing container, whereby the interior of the processing container is maintained in a state under a predetermined high pressure.

Moreover, a continuous high-pressure processing apparatus comprises a supply tank for storing a feedstock and agitating the feedstock therein for homogenization; a pressurizing pump for sucking the feedstock in the supply pump and supplying the sucked feedstock continuously to a processing container under pressure; the processing container for holding the feedstock to reside therein in a high-pressure state for a predetermined period of time while the feedstock is agitated for homogenization; a flow resistance for discharging the processed feedstock continuously from the processing container under depressurization, the flow resistance being able to adjust pressure; a pressure-release bypassing circuit provided in parallel to the flow resistance; and piping connected to the processing container, whereby the interior of the processing container is maintained in a state under a predetermined high pressure for continuous processing therein.

Preferably, the processing container has the temperature adjusting function to heat or cool the feedstock in the processing container.

Preferably, the apparatus further comprises a cooling container downstream of the flow resistance to cool the processed feedstock.

Preferably, in the apparatus, a plurality of processing containers are connected to each other in series, and the flow resistance and the pressure-release bypassing circuit are provided between the processing containers, whereby the interiors of the processing containers are maintained in states under high pressures changing step by step.

Preferably, the flow resistance comprises a line designed to have a specific pipe length and/or pipe diameter, and a plurality of valves disposed in the line, the valves being switched on/off to change a resistance value, whereby the interior of the processing container is maintained in a state under a predetermined high pressure.

Preferably, in the apparatus, the flow resistance is constituted as a throttle valve.

Preferably, the apparatus further comprises a pressure sensor attached to the processing container or a piping connected to the processing container, a resistance value of the flow resistance being controlled in accordance with a pressure signal from the pressure sensor, whereby the interior of the processing container is maintained in a state under a predetermined high pressure.

DESCRIPTION OF THE PREFERRED EMBODIMENTS

Embodiment 1

Preferred embodiments of a continuous high-pressure processing method and apparatus of the present invention will be described below with reference to the drawings.

Note that components identical or equivalent to those in the conventional apparatus are denoted by the same numerals in the following description. To begin with, a first embodiment of the present invention will be described with reference to FIG. 1.

Figure 1:
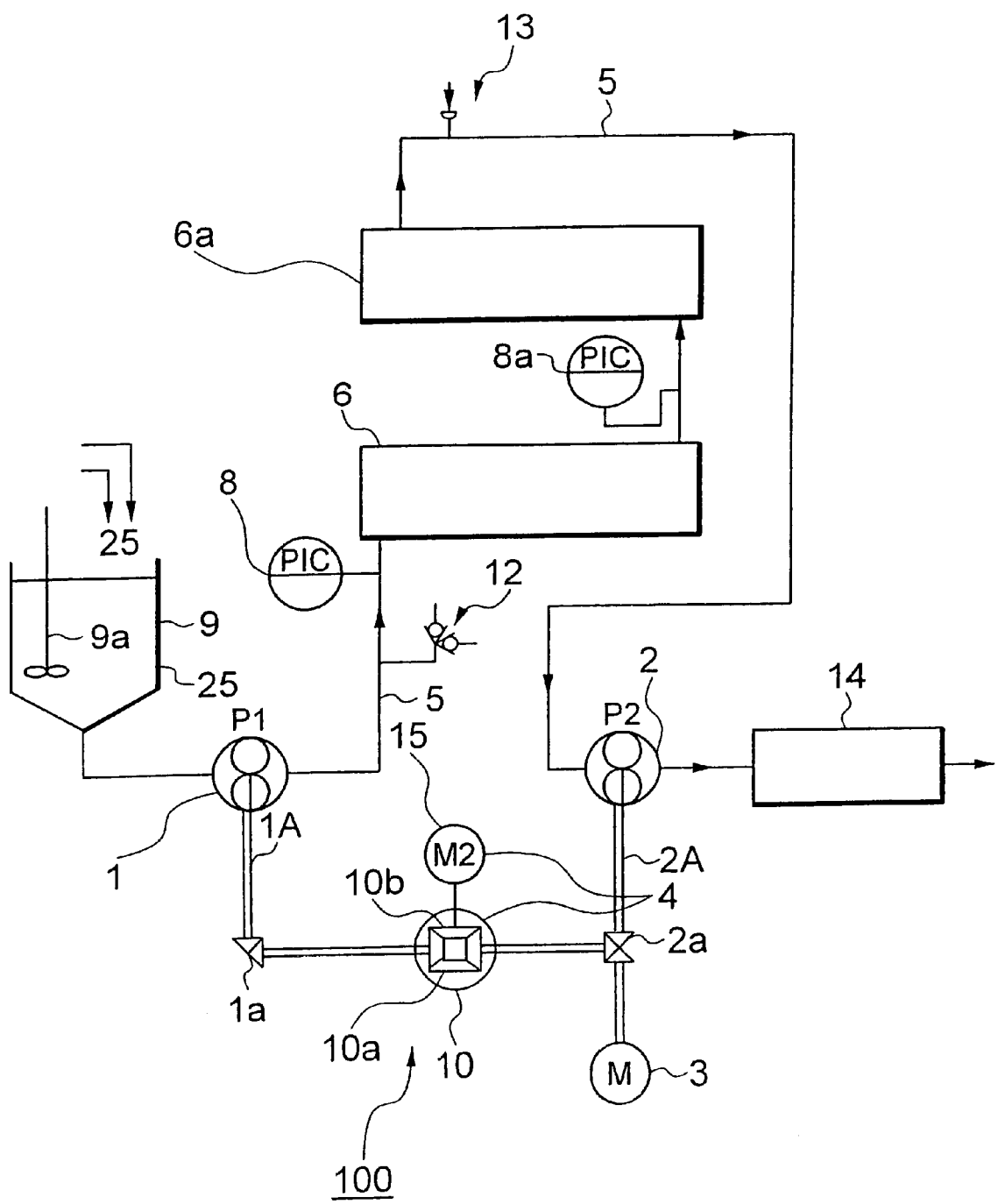
FIG. 1 is a block diagram of a continuous high-pressure processing apparatus according to a first embodiment of the present invention.

In the first embodiment of FIG. 1, the present invention is applied to a production line for an oil-and-fat composition. Numeral 9 denotes a supply tank for storing feedstock 25 of food. The feedstock 25 is agitated by an agitator 9a in the supply tank 9 and is supplied to a pressurizing pump 1. The pressurizing pump 1 is connected to a depressurizing pump 2 and then to a ripening apparatus 14 through pipes (piping) 5 and a pair of processing containers 6, 6a. Pressure sensors 8, 8a and a safety valve 12 are connected to the piping 5. The processing containers 6, 6a are, though not shown in detail, constructed to be able to heat and cool their inner spaces.

A drive shaft 1A of the pressurizing pump 1 and a drive shaft 2A of the depressurizing pump 2 are connected to a well-known driving distributor 10 through a first gear unit 1a and a second gear unit 2a, respectively. A main drive motor 3 is coupled to the second gear unit 2a, and a speed regulating motor 15 is coupled to a second gear 10b of the driving distributor 10. The second gear 10b and the speed regulating motor 15 cooperatively constitute a speed regulator 4.

Furthermore, the speed regulator 4 and the driving distributor 10 cooperatively constitute a control means 100 for controlling speeds, i.e., delivery rates (flow rates), of the pumps 1, 2. During operation, the pumps 1, 2 are controlled by the control means 10 such that a first delivery rate of the pressurizing pump 1 is set to be larger than a second delivery rate of the depressurizing pump 2. As a result, the interiors of the processing containers 6, 6a and the piping 5 are held in the state under a predetermined high-pressure.

The operation of this first embodiment will now be described.

In the production line for an oil-and-fat composition shown in FIG. 1, edible oils and fats, listed below, and other raw materials are employed as the feedstock 25. The usable edible oils and fats are those ones usually employed in oil-and-fat processed products, e.g., natural oil (such as animal oil, vegetable oil and milk fat) and hydrogenated oil thereof, fractional oil and hydrogenated oil thereof, interesterification oil, and randomization oil in the sole or mixed form. These oils and fats are used either alone or as a W/O emulsion emulsified with water. Further, the feedstock may be mixed with other additives such as flavor ingredients, essences, nutrients, emulsifiers, viscosity improvers, and antioxidants.

Those materials are introduced as the feedstock 25 to the supply tank 9 and mixed by the agitator 9a.

The delivery rates (flow rates) of the pressurizing pump 1 and the depressurizing pump 2 are selected to be substantially equal to each other.

The pair of processing containers 6, 6a disposed midway the piping 5 extending between the pressurizing pump 1 and the depressurizing pump 2 each have the functions of cooling and agitating the feedstock 25. The feedstock 25 is agitated with rotation of an internal doctor blade (not shown) so that the feedstock 25 is uniformly cooled. The feedstock 25 passes the pair of the processing containers 6, 6a successively while being agitated and cooled for continuous processing in the state of under high pressure of about 40 MPa (in the range of 10 MPa-150 MPa).

The processed feedstock 25 having viscosity increased with cooling passes through the depressurizing pump 2 and then enters the ripening apparatus 14 in which it is extruded into the sheet- or block-like form and packaged as final products.

During the operation, as described above, the pressure in the piping 5 and the processing containers 6, 6a between the pressurizing pump 1 and the depressurizing pump 2 is increased by reducing the delivery rate of the depressurizing pump 2 as compared with the delivery rate of the pressurizing pump 1. Specifically, the rotational speed of the depressurizing pump 2 is reduced by the speed regulator 4 that is constituted as part of the driving distributor 10. The driving distributor 10 is constituted by a well-known mechanism that enables the speed to be controlled as desired, such as differential gears, a differential harmonic drive device, or a cone-type Bayer transmission. The speed control is made by adjusting the rotational speed of the speed regulating motor 15.

As the delivery rate of the depressurizing pump 2 reduces, the flow in the piping 5 downstream of the depressurizing pump 2 is restricted (throttled) to increase the pressure in the piping 5, etc. An internal leak of each pump 1, 2 is increased with a pressure increase, but the pressure in the piping 5, etc. is balanced at an increased level. Although the internal leak differs depending on the type and size of the pump used, it is approximately 10% under pressure of 40 MPa when a gear pump with power of 11 kW is used. Note that the internal leak is reduced by increasing the entire apparatus size and employing a larger pump.

When the pressurizing pump 1 and the depressurizing pump 2 are constituted by gear pumps, the depressurizing pump 2 acts as a gear motor because of the inlet (suction) side of the depressurizing pump 2 being subjected to a higher pressure, and torque of the gear motor is transmitted to the pressurizing pump 1 through the driving distributor 10. In practice, the depressurizing pump 2 is constituted by using an ordinary pressurizing pump and installing it such that its delivery side is connected to the pipe on the suction side, whereby the installed pump is rotated in a reverse direction to the normal case and acts as a motor. As a result, the power of the main drive motor 3 required for driving the pumps 1, 2 is reduced as compared with that required in the conventional apparatus in which the depressurizing pump is not employed.

Further, the pressures at different points of the piping 5 are detected by pressure sensors 8, 8a attached to the respective pipes, and are adjusted by controlling the speed of the speed regulating motor 15.

Generally, an internal leak of a pump is increased as pressure rises, and a pump delivery rate is reduced with a pressure rise. Also, since even a liquid is compressive, a liquid volume is contracted under high pressure and a pump delivery rate is reduced. Assuming, for example, a system in which a multistage (three-stage) gear pump with power of 20 kW is used to feed at a delivery pressure of 40 MPa a feedstock having a viscosity comparable to an ordinary lubricating oil, the pump delivery rate is reduced down to 88% of that obtained at a delivery pressure of 0.5 MPa. When using a depressurizing pump constituted by a (three-stage) gear pump having the similar structure and type, the depressurizing pump also produces an internal leak to the same extent as in the above case. To maintain the high pressure in the piping 5, therefore, the internal leak of about 12% produced in the depressurizing pump 2 is also compensated by control of the speed regulator 4. The speed regulator 4 is controlled so as to speed up the pressurizing pump 1 or slow down the depressurizing pump 2. In this system, such speed control of the pump is made at a rate of 12% when both the pumps are adjusted, or 24% when one pump is adjusted, in order to compensate for the internal leaks of the two pumps. This rate of the speed control is reduced by using a pump that produces a smaller amount of internal leak. Also, as the viscosity of the feedstock increases, the internal leak produced in each pump is reduced and the rate of the speed control is also reduced. Further, by using a plunger-type pump as the pressurizing pump 1, the internal leak during pressurization becomes smaller than the case of using a gear pump, and a reduction of the overall flow rate is kept at a lower level.

In actual operation, the feedstock 25 in the supply tank 9 is fed into the line by energizing the main drive motor 3 for the pressurizing pump 1, and in sync with the startup of the motor 3, the speed regulating motor 15 is driven so as to rotate the depressurizing pump 2 at a lower speed than the pressurizing pump 1. The pressure in the piping 5 is gradually increased. The pressure in the piping 5 is detected by the pressure sensor 8 and is adjusted to a setting value under control of the speed regulating motor 15. The pressure in the piping 5 may be detected for adjustment at any desired point along the line; that is, it may be detected by the pressure sensor 8a, for example.

The overall flow rate can be changed by regulating the speed of the main drive motor 3 if necessary. By slowly changing the overall flow rate, the pressure in the piping 5 can be maintained at a desired high pressure so as to follow the setting value by controlling the motor 15 of the speed regulator 4, because it is detected by the pressure sensor 8.

An air purge valve 13 purges air from the piping 5 and the safety valve 12 prevents an excessive pressure rise for protection of the apparatus.

Each of the processing containers 6, 6a is a container with the cooling and agitating functions, as described above, and processes an oil-and-fat composition in the state under high pressure for crystallization under cooling (pressure crystallization). The agitating speed and the cooling rate are changed depending on the degree of crystallization.

The driving mechanism of each pump 1, 2 are designed to have such a rigidity that the driving mechanism will not undergo hunting (vibration) due to changes of the pressure in the piping 5.

Further, the control of the speed regulator 4 is also performed with a control loop gain reduced so as to avoid hunting of the line pressure.

The arrangement shown in FIG. 1 can be modified in various ways as follows.

The pressurizing pump 1 may be sped up to provide a speed difference between the pumps 1 and 2.

The pressurizing pump 1 may be any of various types of pumps such as piston, plunger and gear pumps.

The depressurizing pump 2 may be any of a piston pump (using a swash plate), an inscribed gear pump, a circumscribed gear pump, etc. which can also be used as motors.

Since the depressurizing pump 2 is used to slowly reduce pressure, it may be of the multistage type.

The pumps 1, 2 may be arranged at any desired positions along the piping depending on a portion that requires a high pressure to be created therein. For example, when a high pressure is required only in the processing container 6a, the pumps 1, 2 may be arranged respectively upstream and downstream of the processing container 6a. In this case, another low-pressure pump 26 may be provided to feed the feedstock to the processing container 6.

While one pair of pumps 1, 2 are provided in this embodiment, the pumps may be provided in any desired number of sets depending on the system arrangement, i.e., the number of processing containers which are provided in the system and required to be held under high pressure.

Preferably, the pumps 1, 2 are directly coupled with each other or arranged in close relation so that the length of a drive shaft of each pump to the main drive motor 3 is shortened and the driving mechanism is simplified. This arrangement contributes to reducing the size and cost of the apparatus.

The main drive motor 3 may be of the double-axis type. By using such a double-axis motor, the pumps 1, 2 can be arranged on both sides of the motor, and therefore only the speed regulator 4 is needed because the driving distributor 10 is no longer required.

While the above description is premised on that the delivery rates (flow rates) of the pressurizing pump 1 and the depressurizing pump 2 are selected to be substantially equal to each other, the delivery rate of the depressurizing pump 2 may be set to a smaller value beforehand than that of the pressurizing pump 1 in consideration of an internal leak of the pump.

While the above-described system is constructed using the two processing containers 6, 6a, a single or three or more processing containers may be provided.

The high-pressure state is described above as being under a pressure of 40 MPa. However, there is no upper limit on the applied pressure, and the present invention is applicable to even a system brought into the state under several hundreds MPa.

Additionally, according to the method for producing an oil-and-fat composition under a high-pressure condition, the size of crystal particles becomes finer as a result of pressure crystallization, and the amount of crystals is increased. Thus, such a production method is effective in improving a whip property and spreadability in roll-in applications.

Embodiment 2

A second embodiment of the present invention shown in FIG. 2 will be described below. Note that components identical or equivalent to those in FIG. 1 are denoted by the same numerals, and only different components are described here.

Figure 2:
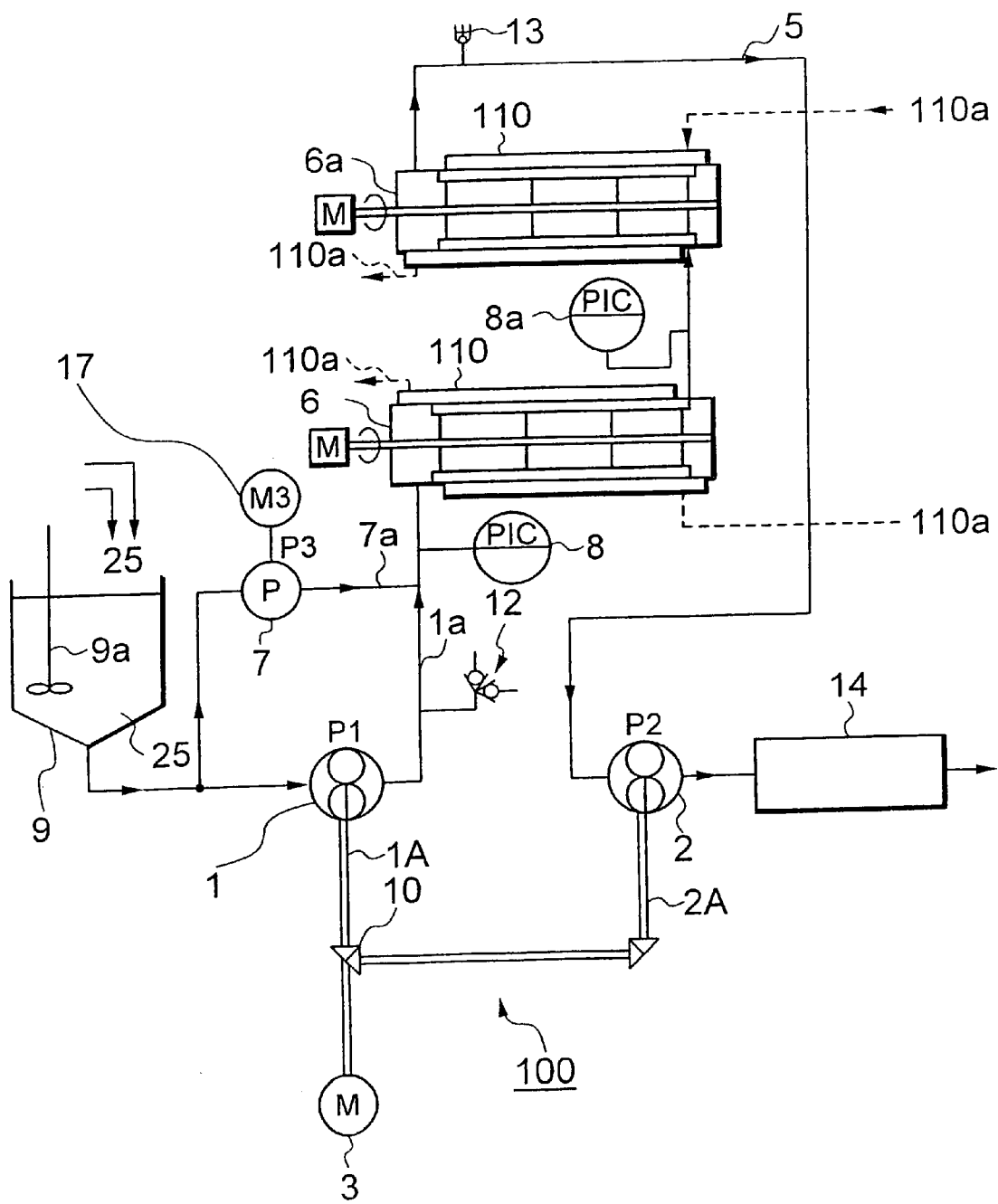
FIG. 2 is a block diagram of a continuous high-pressure processing apparatus according to a second embodiment of the present invention.

In FIG. 2, a cooling unit 110 is provided to surround an outer periphery of each processing container 6, 6a and a coolant 110a is supplied to the cooling unit 110 for cooling.

Also, the control means 100 in FIG. 2 comprises the pressurizing pump 1, the depressurizing pump 2, a driving distributor 10 provided between the depressurizing pump 2 and the main drive motor 3, and an auxiliary pressurizing pump 7 which is connected in parallel to the pressurizing pump 1 and has a delivery rate smaller than that of the pressurizing pump 1. A delivery portion 7a of the auxiliary pressurizing pump 7 is connected to the outlet side 1a of the pressurizing pump 1 for joining of both flow rates, and the pressure sensor 8 and the safety valve 12 are connected to the outlet side 1a. The auxiliary pressurizing pump 7 is driven by a motor, and the delivery rate of the auxiliary pressurizing pump 7 is adjusted such that the joined flow rate produced at the outlet side 1a of the pressurizing pump 1 and the delivery portion 7a of the auxiliary pressurizing pump 7 is larger than the flow rate produced by the depressurizing pump 2.

Further, the processing containers 6, 6a are each provided with the cooling unit 110 to which the coolant 110a is supplied for cooling the interior of the processing container, as described above. The pressure sensor 8a is disposed midway the pipe 5 connecting the processing containers 6, 6a to each other.

A high pressure is maintained in the piping 5 by controlling the auxiliary pressurizing pump 7 so that the feedstock is subjected to continuous high-pressure processing such as pressure crystallization.

With this second embodiment, the pressurizing pump 1 and the depressurizing pump 2 both constituting a main drive system can be driven in a simpler manner, and the equipment cost can be cut down.

Embodiment 3

Figure 3:
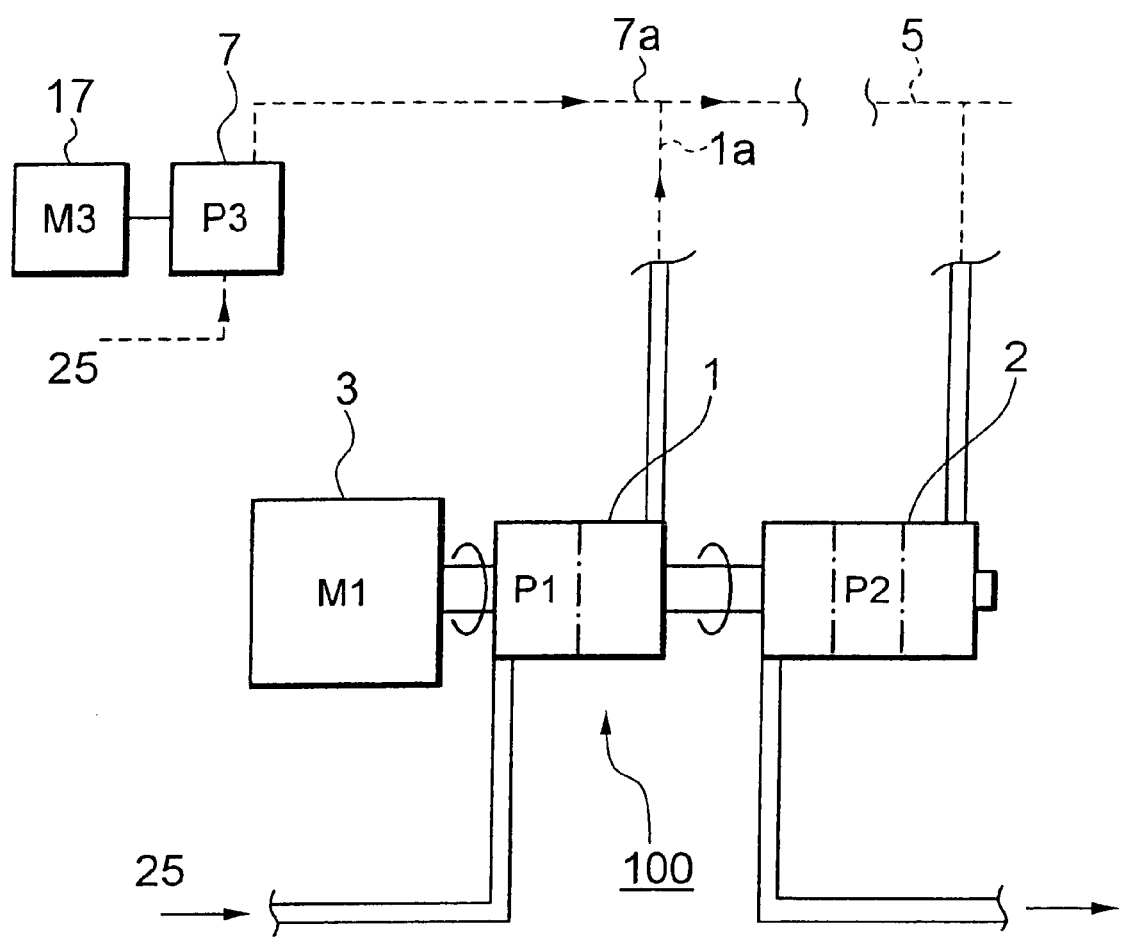
FIG. 3 is a block diagram of a continuous high-pressure processing apparatus according to a third embodiment of the present invention, which a modification of the second embodiment shown in FIG. 2.

FIG. 3 shows a third embodiment of the present invention, as a modification of the second embodiment shown in FIG. 2, in which the drive shafts of the pumps 1, 2 are directly coupled to each other. Although both the drive shafts have aligned axes in FIG. 3, they may be arranged in parallel or in orthogonal relation by using bevel gears.

The pumps 1, 2 are installed in directly-coupled (FIG. 3) or close-proximity arrangement so that driving mechanisms with the main motor 3 have shorter lengths and are simplified. Shorter drive shafts have larger torsion rigidity and are less subjected to torsional vibration and resonance caused by changes and variations in torque drawn from the main drive motor 3 and torque required by the pressurizing pump 1. As a result, a stable operating state is achieved.

The pressure in the piping 5 is adjusted by controlling the speed of the motor 17. The speed control may be made by using an inverter-controlled motor or a servo motor. The driving capacity of the motor 17 is required just to be enough to compensate for the internal leak of the pump, and therefore it may be smaller than the main drive motor 3.

In the third embodiment of FIG. 3, the control means 100 is constituted by the auxiliary pressurizing pump 7 connected in parallel to the pressurizing pump 1 that is directly coupled in series to the main drive motor 3 along with the depressurizing pump 2.

The arrangements shown in FIGS. 2 and 3 can be modified in various ways as follows.

The pressurizing pump 1 may be any of various types of pumps such as piston, plunger and gear pumps.

The depressurizing pump 2 may be any of a piston pump (using a swash plate), an inscribed gear pump, a circumscribed gear pump, etc. which can also be used as motors.

When the pressurizing pump 1 and the depressurizing pump 2 are constituted by different types of pumps, the gear ratio of the driving distributor 10 may be changed to make the rotational speeds of both the pumps in match with each other so that the pumps have the same delivery rate.

Since the depressurizing pump 2 is used to slowly reduce pressure, it may be of the multistage type.

While the drive shafts of both the pumps 1, 2 have aligned axes in FIG. 3, they may be arranged in parallel or in orthogonal relation by using bevel gears.

The main drive motor 3 may be of the double-axis type, and the pressurizing pump 1 and the depressurizing pump 2 may be arranged on both sides of the motor. With this arrangement, the driving mechanism between each pump and the main drive motor 3 can be shortened in length and also simplified.

Embodiment 4

A fourth embodiment of the present invention shown in FIG. 4 will be described below. Note that components identical or equivalent to those in FIG. 2 are denoted by the same numerals, and only different components are described here.

A low-pressure pump 26 and a temperature adjusting unit 27 for cooling are both disposed between the supply pump 9 and the pressurizing pump 1. The depressurizing pump 2 is, e.g., a variable displacement motor of displaceable piston type that can be also used as a motor. Further, the depressurizing pump 2 employs, as a pilot pressure, the pressure in the piping 5 on the suction side, and the pilot pressure can be adjusted using pressure signals from the pressure sensors 8, 8a attached to the piping 5.

The processing pressure in each of the processing containers 6, 6a disposed midway the piping 5 is adjusted to a desired high value by controlling the delivery rate of the depressurizing pump 2.

A high pressure is maintained in the piping 5 under the delivery rate control of the depressurizing pump 2, and the feedstock is subjected to continuous high-pressure processing such as pressure crystallization.

When the pressurizing pump 1 is of the plunger type and the depressurizing pump 2 is of the displaceable piston type, the rotational speeds of both the pumps 1, 2 are not in match with each other, and hence a speed-up or slow-down gear box 24 for changing a speed ratio between the pumps 1 and 2 is disposed between the main drive motor 3 and the depressurizing pump 2. The gear ratio of the gear box 24 is then selected such that the delivery rates of the two pumps 1, 2 are in match with each other.

With this fourth embodiment, the pressurizing pump 1 and the depressurizing pump 2 both constituting a main drive system can be driven in a simpler manner, and the equipment cost can be cut down.

Incidentally, the auxiliary pressurizing pump 7 used in FIGS. 2 and 3 are not needed.

Furthermore, temperature adjusting units 27, 27a are provided, as preprocessing apparatus as a low pressure, prior to the piping 5 that is brought into the high-pressure state. A coolant 23 is separately introduced to the temperature adjusting units 27, 27a through a plurality of paths for precise temperature adjustment in each unit.

The low-pressure pump 26 is constituted by a low-pressure centrifugal pump. The control means 100 in FIG. 1 comprises the driving distributor 10 provided between the pressurizing pump 1 and the main drive motor 3, and the gear box 24 provided between the driving distributor 10 and the depressurizing pump 2.

Moreover, the piping 5 brought into the high-pressure state is restricted to extend over the least necessary length, and the equipment cost is cut down.

The operation of this fourth embodiment will now be described.

A feedstock (comprising plural kinds of raw materials) 25 is mixed and dispersed under agitation in the supply tank 9 at a relatively high temperature. The feedstock 25 is then introduced to the temperature adjusting units 27, 27a from the supply tank 9 by the low-pressure pump (e.g., centrifugal pump) 26. The temperature of the feedstock 25 is measured by a temperature sensor T1 and, as described above, the coolants 23 are supplied to the temperature adjusting units 27, 27a through a plurality of paths for precise temperature adjustment in each unit. Because it is not required to perform the temperature adjustment of the feedstock under high pressure, this section of the system is constituted by low-pressure equipment.

Then, the feedstock is supplied to and processed in the processing containers 6, 6a provided midway the piping 5 as follows.

The feedstock 25 having been cooled to an adjusted temperature is fed into the piping 5 with rotation of the pressurizing pump 1 driven by the main drive motor 3. Since the depressurizing pump 2 is designed to operate with the suction-side pressure used as a pilot pressure, the delivery rate of the depressurizing pump 2 is smaller than that of the pressurizing pump 1 and the pressure in the piping 5 is gradually increased until the pressure reaches a setting value.

When the piping 5 is brought into the state under high pressure, the depressurizing pump (motor) 2 starts to rotate as a motor with the pressure applied from the feedstock 25. Thus, the depressurizing pump 2 is rotated as a motor while maintaining the high pressure in the piping 2, whereas the produced motor power is supplied to the pressurizing pump 1 through the gearbox 24. Furthermore, the pressure in the ripening apparatus 14 is held at about 1 MPa for the ripening process under low pressure.

The arrangement shown in FIG. 4 can be modified in various ways as follows.

The pressurizing pump 1 may be any of various types of pumps such as piston, plunger and gear pumps.

The depressurizing pump 2 may be any of other types of pumps in addition to a piston pump (using a swash plate), so long as it can also be used as a motor.

An additional low-pressure pump may be disposed at the inlet of the ripening apparatus 14 downstream of the depressurizing pump 2. This arrangement is effective to stabilize the pressure adjusting function of the depressurizing pump 2 and to avoid pressure variations in the ripening apparatus 14 from affecting the pressure in the piping 5.

Further, while the depressurizing pump 2 is described above as being of the variable displacement type, the pressurizing pump 1 may be constituted as a variable displacement pump instead. In the case of using a feedstock that changes in the processing container, the pressurizing pump 1 is preferably constituted as a variable displacement pump. This is because the viscosity of the feedstock becomes more stable and the pressure control becomes easier to implement.

Embodiment 5

A fifth embodiment of the present invention shown in FIG. 5 will be described below. Note that components identical or equivalent to those in FIG. 1 are denoted by the same numerals, and only different components are described here.

The pressurizing pump 1 is solely driven by the main drive motor 3 that is of the inverter-controlled type, and the depressurizing pump 2 is driven by a second motor 18 that is also of the inverter-controlled type and independent of the main drive motor 3.

A control line 19 extending from a control system (not shown) is connected to the main drive motor 3, and another control line 21 connects the main drive motor 3 and the second motor 18. The high-pressure processing, such as pressure crystallization, is thus continuously carried out while taking out the power from the second motor 18 as electrical energy and utilizing it as the power of the main drive motor 3 for pressurization.

Also, the rotation of the second motor 18 is controlled in accordance with a pressure signal from the pressure sensor 8, which is taken in through a signal line 20.

When taking out, as electrical energy, the power from the second motor 18 for depressurization, the energy is not always recovered depending on the selection of the motor and the setup of the control system. In any case, however, the second motor 18 requires a much smaller amount of electrical energy than required by the main drive motor 3 for the pressurizing pump 1.

Incidentally, an amplifier for the second motor 18 has a regeneration terminal through which a regeneration current is taken out to the outside.

The depressurizing pump 2 is connected to the piping 5 in such a condition that the suction side is subjected to a higher pressure and the delivery side is subjected to a lower pressure. Therefore, the control means 100 is constituted by the main drive motor 3 of the pressurizing pump 1 and the second motor 18 of the depressurizing pump 2.

A first example of the operation of the fifth embodiment shown in FIG. 5 will now be described. Herein, the main drive motor 3 of the pressurizing pump 1 and the second motor 18 of the depressurizing pump 2 are inverter-controlled motors.

The feedstock 25 is fed into the piping 5 from the supply tank 9 with rotation of the pressurizing pump 1 driven by the main drive motor 3. By setting the delivery rate of the depressurizing pump 2 to be smaller than that of the pressurizing pump 1, the pressure in the piping 5 is gradually increased.

When the piping 5 is brought into the state under high pressure, the second motor 18 starts to rotate as a motor with the pressure applied from the feedstock 25, and the generated power is recovered as electrical energy by the second motor 18. The recovered electrical energy is supplied to the main drive motor 3, whereby the feedstock is promoted to flow toward the delivery side of the pressurizing pump 1.

Next, a second example of the operation of the fifth embodiment shown in FIG. 5 will be described. In the arrangement of FIG. 5, at least the second motor 18 of the depressurizing pump 2 is constituted as a servo motor. The pressure in the piping 5, which depends on the rotational speed of the servo motor, is detected by the pressure sensor 8 attached to the piping 5, and the rotational speed of the second motor 18 is electrically controlled in accordance with the value of a pressure signal from the pressure sensor 8. The main drive motor 3 of the pressurizing pump 1 is constituted by an ordinary inverter-controlled motor so as to provide stable and strong rotation.

With this second example of the operation, mechanical hardware is simplified and the rotation control, i.e., the control of the pressure in the piping 5, is performed using the known control technology that has been remarkably developed in recent days.

The rotation control of the main drive motor 3 is performed in accordance with a flow rate command value applied from the outside (through the control line 19), and the rotation control of the second motor 18 is performed in accordance with both a flow rate command value applied from the outside (through the control line 21) and the pressure signal applied from the pressure sensor 8 (through the signal line 20).

Next, a third example of the operation of the fifth embodiment shown in FIG. 5 will be described. This third example of the operation is basically similar to the above-described second example of the operation except for the following points.

Figure 5:
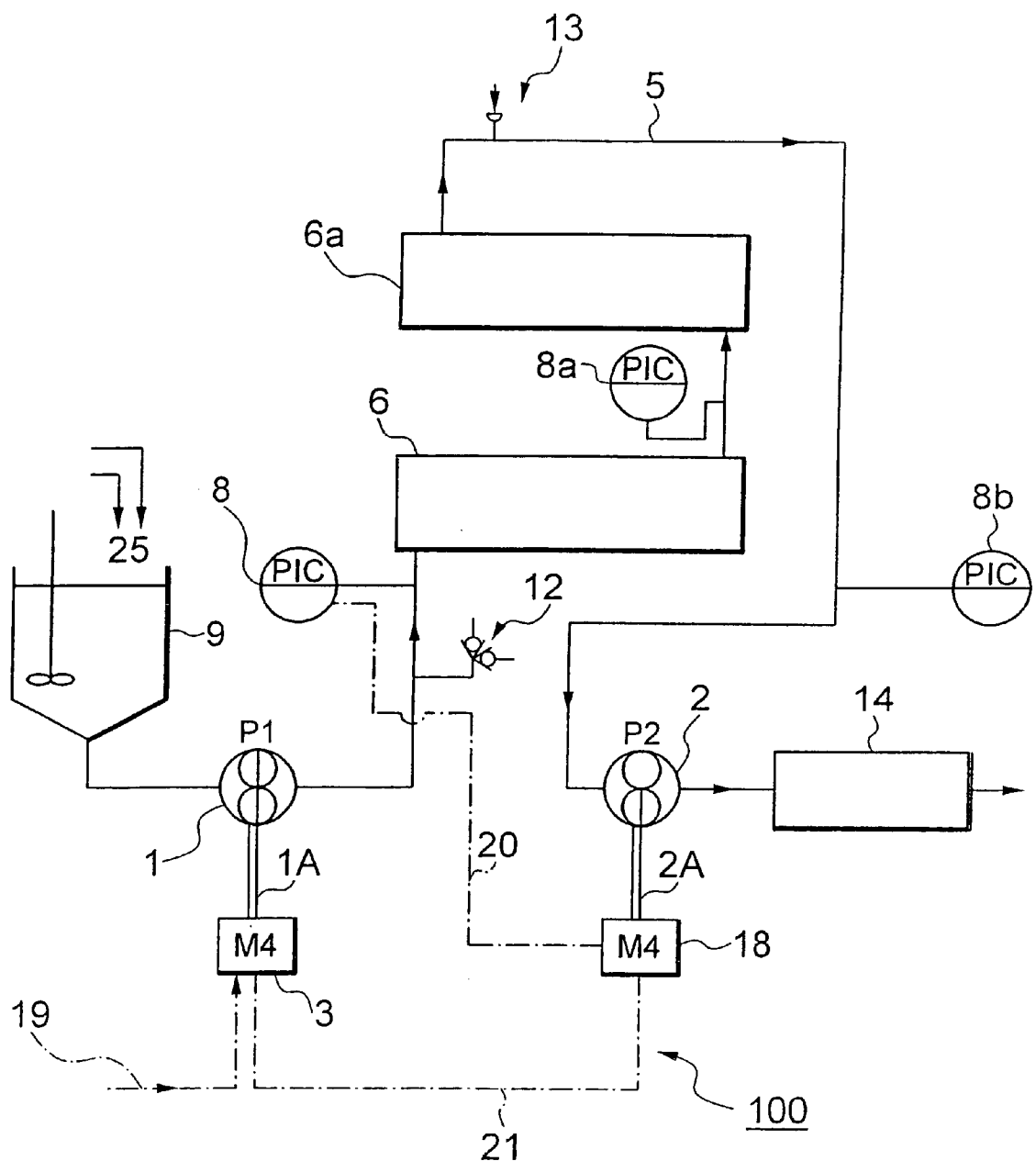
FIG. 5 is a block diagram of a continuous high-pressure processing apparatus according to a fifth embodiment of the present invention.

The motors 3, 18 in FIG. 5 are each constituted as a servo motor.

The overall flow rate of the feedstock (overall delivery rate) is adjusted by controlling the speed of the main drive motor 3 in accordance with a flow rate command value applied from the outside (through the control line 19).

The pressure in the piping 5 is detected by the pressure sensor 8, 8*a* or 8*b* and is adjusted by electrically controlling the rotational speed of the second motor 18 in accordance with the value of a pressure signal from the pressure sensor 8, 8*a* or 8*b*. More specifically, a speed difference between both the motors 3, 18 is detected by encoders (though not shown, well-known speed and rotation detectors) built in the motors 3, 18, and the speed difference is precisely servo-controlled to thereby control the speed of the second motor 18. In this case, the speed of the main drive motor 3 is employed as a reference one, and therefore the speed of the second motor 18 is made variable.

When the pressure in the piping 5 is lower than the setting value, the speed of the second motor 18 is reduced to raise the pressure in the piping 5. Conversely, when the pressure in the piping 5 is higher than the setting value, the speed of the second motor 18 is increased to lower the pressure in the piping 5. In the latter case, the control line 21 is employed.

Further, when varying the overall flow rate, the speed of the main drive motor 3 is slowly changed. At this time, since the pressure in the piping 5 is adjusted based on the speed difference between the drive shafts of the pumps 1, 2, the speed of the second motor 18 is also changed following the change in the speed of the main drive motor 3. As a result, the overall flow rate is varied while the pressure in the piping 5 is maintained at the same level.

Generally, in spite of the flow rate being varied, the amount of internal leak in each pump is kept substantially constant if the pressure in the piping 5 is constant. Thus, when the overall flow rate is varied, the speeds of the two motors 3, 18 are changed while the speed difference between them is kept constant.

The operation of this fifth embodiment is equivalent to the case where the speed regulator 4 in the first embodiment of FIG. 1 is electrically constructed using a servo motor.

In the second and third examples of the operation described above, a command for the entire flow rate may be instructed to the second motor 2, and the speed of the main drive motor 3 may be changed in a following manner.

Figure 4:
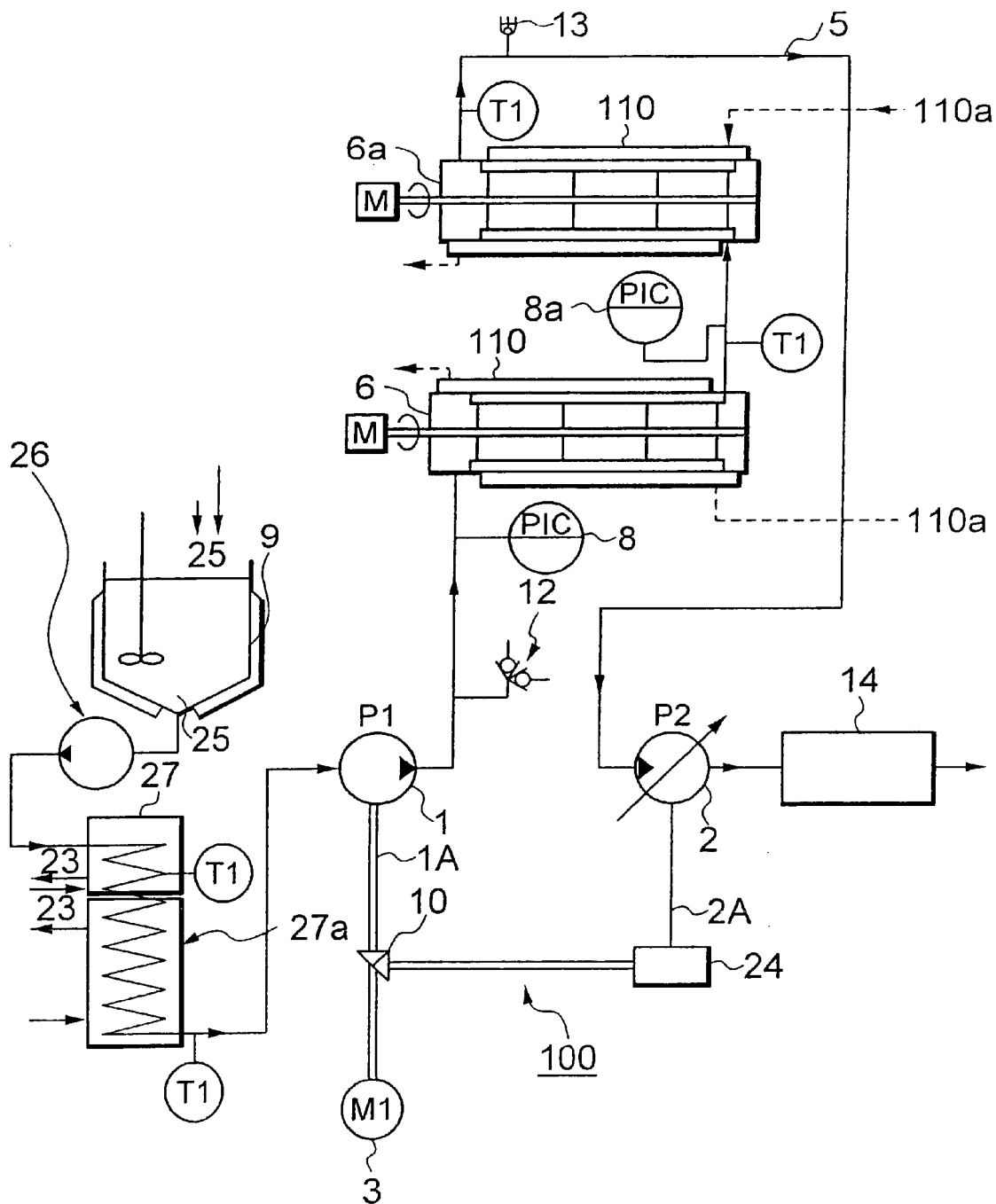
FIG. 4 is a block diagram of a continuous high-pressure processing apparatus according to a fourth embodiment of the present invention.
Figure 6:
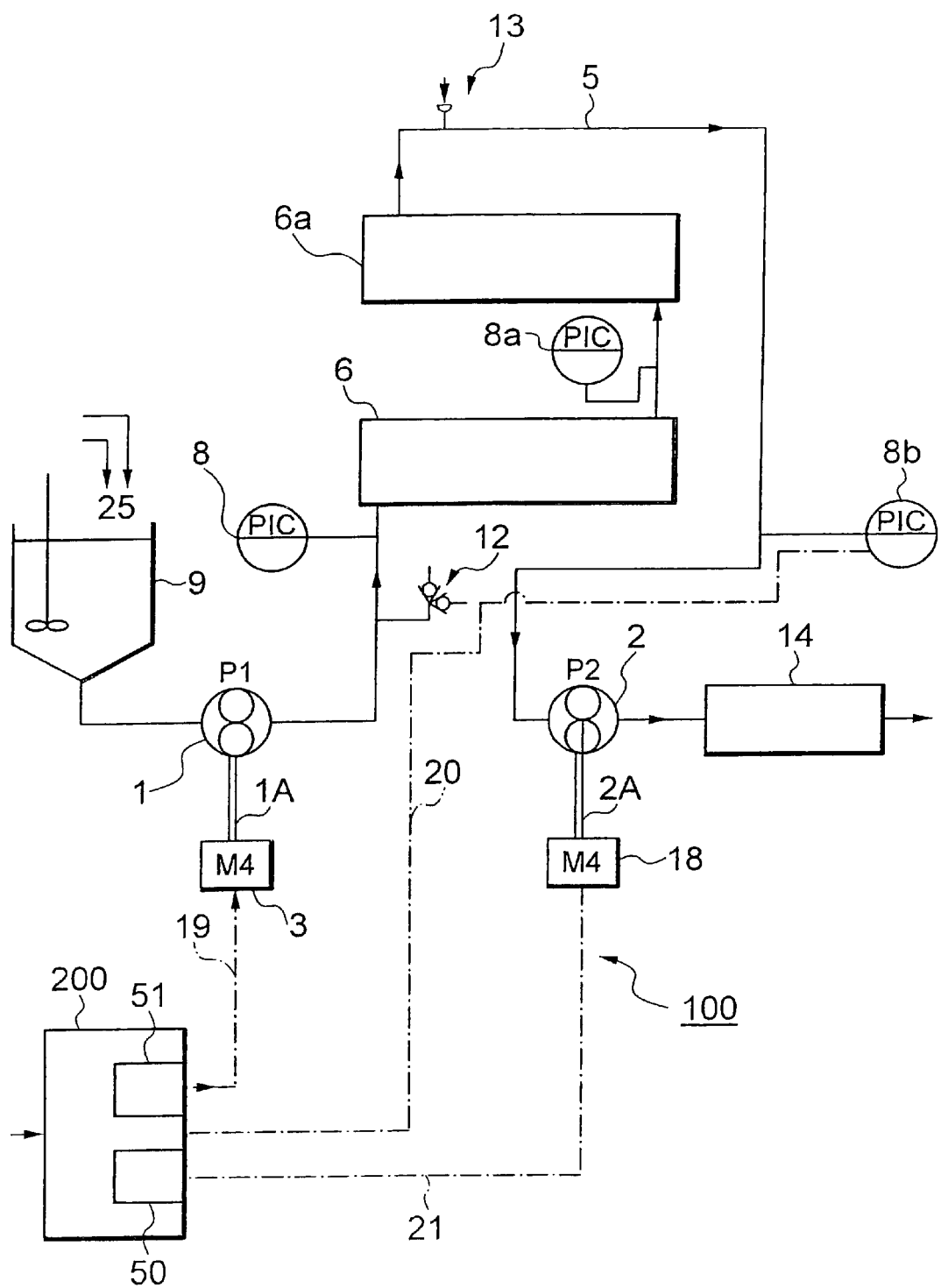
FIG. 6 is a block diagram of a continuous high-pressure processing apparatus according to a sixth embodiment of the present invention.

While the pressure sensors 8, 8a are disposed in the embodiments of FIGS. 1, 2 and 4, another pressure sensor 8b may be additionally attached to the piping 2 as shown in FIG. 6. The pump control may be performed using a pressure signal from any one the pressure sensors 8, 8a, 8b.

Additionally, an experiment was conducted on the first embodiment of FIG. 1 by using the main drive motor 3 of 5.5 kW under pressure of 35 MPa. An experiment result revealed that the required power of the main drive motor 3 was reduced down to $2/3$.

Also, the expression "reducing the delivery rate of the depressurizing pump 2" in the first embodiment of FIG. 1, for example, means that the speed of the pump shaft is reduced, not taking into account the internal leak of the pump. The actual flow rates of the feedstock passing through the pressurizing pump 1 and the depressurizing pump 2, including the internal leak in each pump, are the same in an equilibrium condition.

Embodiment 6

A sixth embodiment of the present invention shown in FIG. 6 will be described below. The sixth embodiment of FIG. 6 is a modification of the above-described fifth embodiment shown in FIG. 5.

Note that components identical or equivalent to those in FIG. 5 are denoted by the same numerals, and only different components are described here.

The pressurizing pump 1 is solely driven by the main drive motor 3 that is of the inverter-controlled type, and the depressurizing pump 2 is driven by a second motor 18 that is also of the inverter-controlled type and independent of the main drive motor 3.

An amplifier 51 (inverter) in a control panel 200 is connected to the main drive motor 3 via a control line 19 (drive line for controlling the motor rotational speed). Further, the main drive motor 3 and the second motor 18 are indirectly connected to each other via another control line 21 and another amplifier 50 (inverter) in the control panel 200. The high-pressure processing, such as pressure crystallization, is thus continuously carried out while recovering or saving the power from the second motor 18 as electrical energy.

Also, the rotation of the second motor 18 is controlled in accordance with a pressure signal from the pressure sensor 8b, which is taken in through a signal line 20. The pressure signal may be supplied from the pressure sensor 8 or 8a.

When taking out, as electrical energy, the power from the second motor 18 for depressurization, the energy is not always recovered depending on the selection of the motor and the setup of the control system. In any case, however, the second motor 18 requires a much smaller amount of electrical energy than required by the main drive motor 3 for the pressurizing pump 1.

Incidentally, the amplifier 50 (inverter) for the second motor 18 has a regeneration terminal through which a regeneration current is taken out to the outside.

The depressurizing pump 2 is connected to the piping 5 in such a condition that the suction side is subjected to a higher pressure and the delivery side is subjected to a lower pressure. Therefore, the control means 100 is constituted by the main drive motor 3 of the pressurizing pump 1 and the second motor 18 of the depressurizing pump 2.

A first example of the operation of the sixth embodiment shown in FIG. 6 will now be described. Herein, the main drive motor 3 of the pressurizing pump 1 and the second motor 18 of the depressurizing pump 2 are inverter-controlled motors.

The feedstock 25 is fed into the piping 5 from the supply tank 9 with rotation of the pressurizing pump 1 driven by the main drive motor 3. By setting the delivery rate of the depressurizing pump 2 to be smaller than that of the pressurizing pump 1, the pressure in the piping 5 is gradually increased.

When the piping 5 is brought into the state under high pressure, the second motor 18 starts to rotate as a motor with the pressure applied from the feedstock 25, and the generated power is recovered as electrical energy by the amplifier 50 (inverter) having the regeneration terminal through the second motor 18. Accordingly, the system can be operated with saving of the total electrical energy required by the main drive motor 3 and the second motor 18.

Next, a second example of the operation of the sixth embodiment shown in FIG. 6 will be described. In the arrangement of FIG. 6, at least the second motor 18 of the depressurizing pump 2 is constituted as a serve motor. The pressure in the piping 5, which depends on the rotational speed of the servo motor, is detected by the pressure sensor 8b attached to the piping 5, and the rotational speed of the second motor 18 is electrically controlled in accordance with the value of a pressure signal from the pressure sensor 8b. The main drive motor 3 of the pressurizing pump 1 is constituted by an ordinary inverter-controlled motor so as to provide stable and strong rotation.

With this second example of the operation, mechanical hardware is simplified and the rotation control, i.e., the control of the pressure in the piping 5, is performed using the known control technology that has been remarkably developed in recent days.

The rotation control of the main drive motor 3 is performed in accordance with a flow rate command value applied from the outside (through the control line 19), and the rotation control of the second motor 18 is performed in accordance with a flow rate command value (applied through the control line 21) based on the pressure signal applied from the pressure sensor 8b (through the signal line 20). The pressure signal may be applied from the pressure sensor 8 or 8a.

Next, a third example of the operation of the sixth embodiment shown in FIG. 6 will be described. This third example of the operation is basically similar to the above-described second example of the operation except for the following points.

The motors 3, 18 in FIG. 5 are each constituted as a servo motor.

The overall flow rate of the feedstock (overall delivery rate) is adjusted by controlling the speed of the main drive motor 3 in accordance with a flow rate command value applied from the outside (through the control line 19).

The pressure in the piping 5 is detected by the pressure sensor 8, 8a or 8b and is adjusted by electrically controlling the rotational speed of the second motor 18 in accordance with the value of a pressure signal from the pressure sensor 8, 8a or 8b. More specifically, a speed difference between both the motors 3, 18 is detected by encoders (though not shown, well-known speed and rotation detectors) built in the motors 3, 18, and the speed difference is precisely servo-controlled to thereby control the speed of the second motor 18. In this case, the speed of the main drive motor 3 is employed as a reference one, and therefore the speed of the second motor 18 is made variable.

When the pressure in the piping 5 is lower than the setting value, the speed of the second motor 18 is reduced to raise the pressure in the piping 5. Conversely, when the pressure in the piping 5 is higher than the setting value, the speed of the second motor 18 is increased to lower the pressure in the piping 5. In the latter case, the control line 21 is employed.

Further, when varying the overall flow rate, the speed of the main drive motor 3 is slowly changed. At this time, since the pressure in the piping 5 is adjusted based on the speed difference between the drive shafts of the pumps 1, 2, the speed of the second motor 18 is also changed following the change in the speed of the main drive motor 3. As a result, the overall flow rate is varied while the pressure in the piping 5 is maintained at the same level.

Generally, in spite of the flow rate being varied, the amount of internal leak in each pump is kept substantially constant if the pressure in the piping 5 is constant. Thus, when the overall flow rate is varied, the speeds of the two motors 3, 18 are changed while the speed difference between them is kept constant.

The operation of this sixth embodiment is equivalent to the case where the speed regulator 4 in the first embodiment of FIG. 1 is electrically constructed using a servo motor.

In the second and third examples of the operation described above, a command for the entire flow rate may be instructed to the second motor 2, and the speed of the main drive motor 3 may be changed in a following manner.

Embodiment 7

Figure 7:
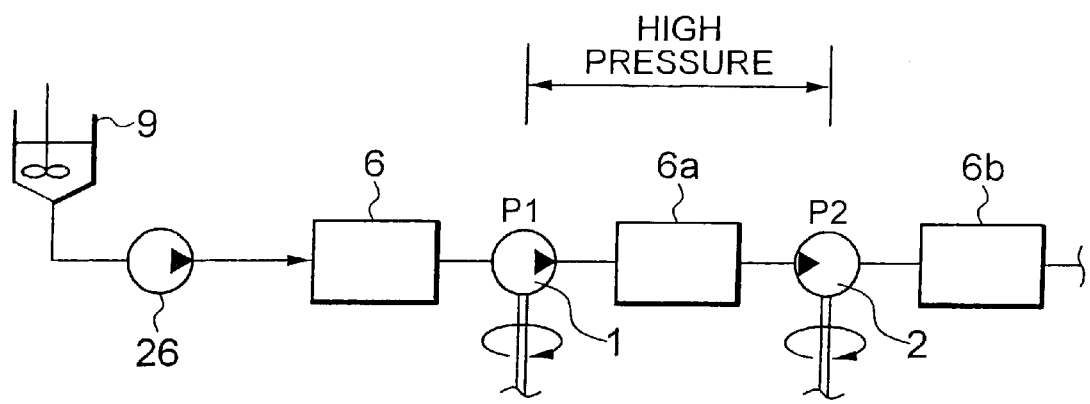
FIG. 7 is a block diagram of a continuous high-pressure processing apparatus according to a seventh embodiment of the present invention.

The pumps 1, 2 may be arranged at any desired positions along the piping depending on a portion that requires a high pressure to be created therein. For example, when a high pressure is required only in the processing container 6a, the pumps 1, 2 may be arranged respectively upstream and downstream of the processing container 6a. One example of this arrangement is shown in FIG. 7 as a seventh embodiment. In the seventh embodiment, a low-pressure pump 26 is provided to feed the feedstock to the processing container 6.

Embodiment 8

Figure 8:
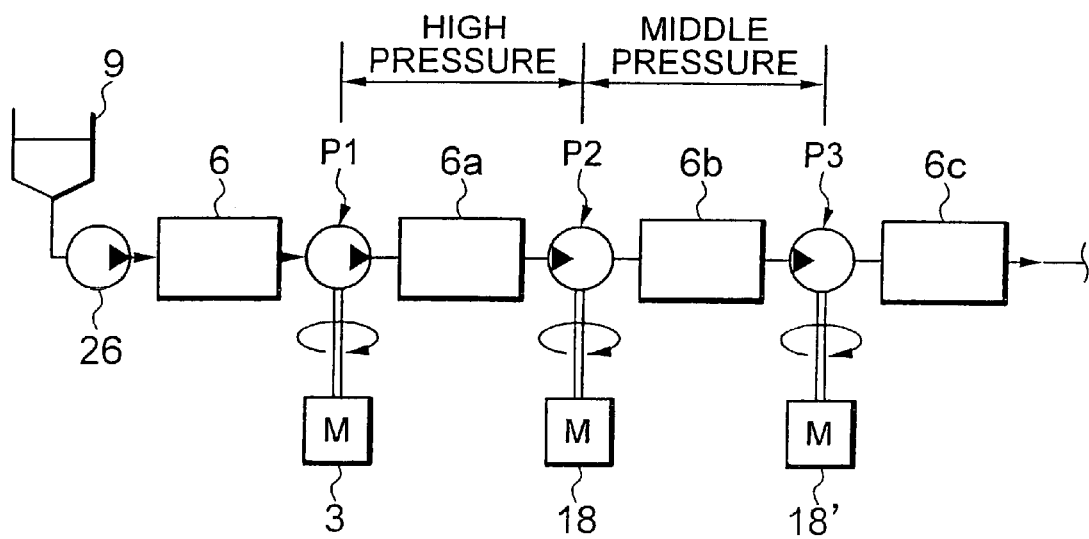
FIG. 8 is a block diagram of a continuous high-pressure processing apparatus according to an eighth embodiment of the present invention.

While one pair of pumps 1, 2 are provided in the above sixth embodiment, the pumps may be provided in any desired number of sets depending on the system arrangement, i.e., the number of processing containers which are provided in the system and required to be held under high pressure. One example of this arrangement is shown in FIG. 8 as an eighth embodiment. In the eighth embodiment, pumps P1, P2 and P3 are operated by separate and independent motors 2, 18, 18', shown in FIG. 8, under electrical speed control so as to set respective pressures required in processing containers 6a, 6b. In the illustrated example, the processing container 6a is set to a high pressure and the processing container 6b is set to a medium pressure.

Preferably, the pumps 1, 2 are directly coupled with each other or arranged in close relation so that the length of a drive shaft of each pump to the main drive motor 3 is shortened and the driving mechanism is simplified. This arrangement contributes to reducing the size and cost of the apparatus.

The main drive motor 3 may be of the double-axis type. By using such a double-axis motor, the pumps 1, 2 can be arranged on both sides of the motor, and therefore only the speed regulator 4 is needed because the driving distributor 10 is no longer required.

While the above description is premised on that the delivery rates (flow rates) of the pressurizing pump 1 and the depressurizing pump 2 are selected to be substantially equal to each other, the delivery rate of the depressurizing pump 2 may be set to a smaller value beforehand than that of the pressurizing pump 1 in consideration of an internal leak of the pump.

While the above-described system is constructed using the two processing containers 6, 6a, a single or three or more processing containers may be provided.

The high-pressure state is described above as being under pressure of 40 MPa. However, there is no upper limit of the applied pressure, and the present invention is applicable to a system brought into the state under several hundreds MPa.

Figure 9:
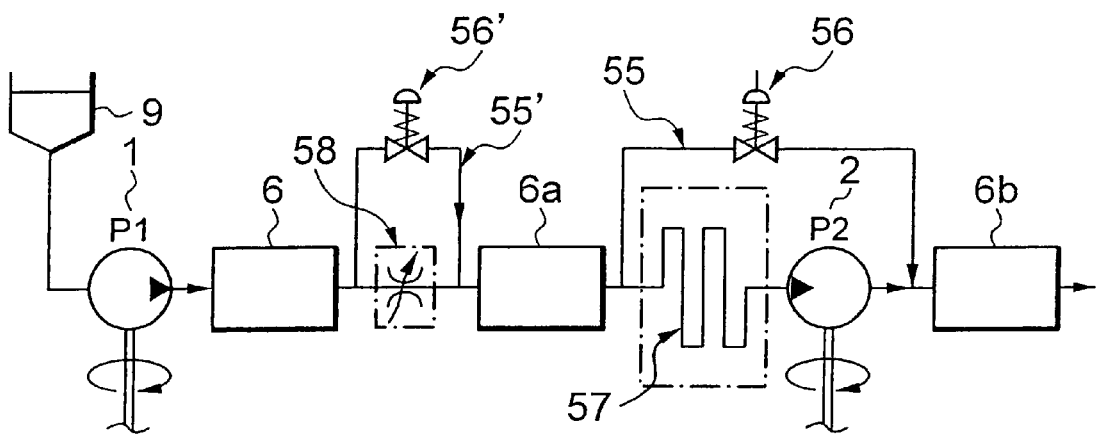
FIG. 9 is a block diagram of a continuous high-pressure processing apparatus according to a ninth embodiment of the present invention.

Further, in connection with the related art, several examples of the processing method using a throttle or utilizing a pipe (flow) resistance are described and the reasons why those methods have a difficulty in pressure adjustment are explained above. By assembling those methods in part of the system according to the present invention, however, those methods can be practiced to achieve the pressure adjustment, and at the same time a high-pressure load imposed on the depressurizing pump 2 can be reduced. One example of such an arrangement is shown in FIG. 9 as a ninth embodiment. This ninth embodiment is effective in reducing the load of the depressurizing pump 2 that is imposed under a high processing pressure in the range of 40 MPa to several hundreds MPa.

Embodiment 9

Also, in the ninth embodiment of FIG. 9, taking into consideration that a line resistance 57, a throttle 58 and the depressurizing pump 2 cannot rapidly release the pressure in the event of an abnormal condition, pairs of bypassing circuits 55, 55' and valves 56, 56' are disposed for safety in parallel respectively to the line resistance 57 and the depressurizing pump 2 and to the throttle 58. The valves 56, 56' are operated to open by a spring in the event of an abnormal condition, such as a power outage, or by a motor in accordance with a control signal during the operation, thereby making the system open to release the pressure rapidly. Further, while the arrangement shown in FIG. 10 includes both the line resistance 57 and the throttle 58, one of them may be upstream or downstream of any of the processing containers 6, 6a and 6b. The throttle 58 may be replaced by a depressurizing pump or the like.

Additionally, according to the method for producing an oil-and-fat composition under a high-pressure condition, the size of crystal particles becomes finer as a result of pressure crystallization, and the amount of crystals is increased. Thus, such a production method is effective in improving a whip property and spreadability in roll-in applications.

Embodiment 10

Figure 10:
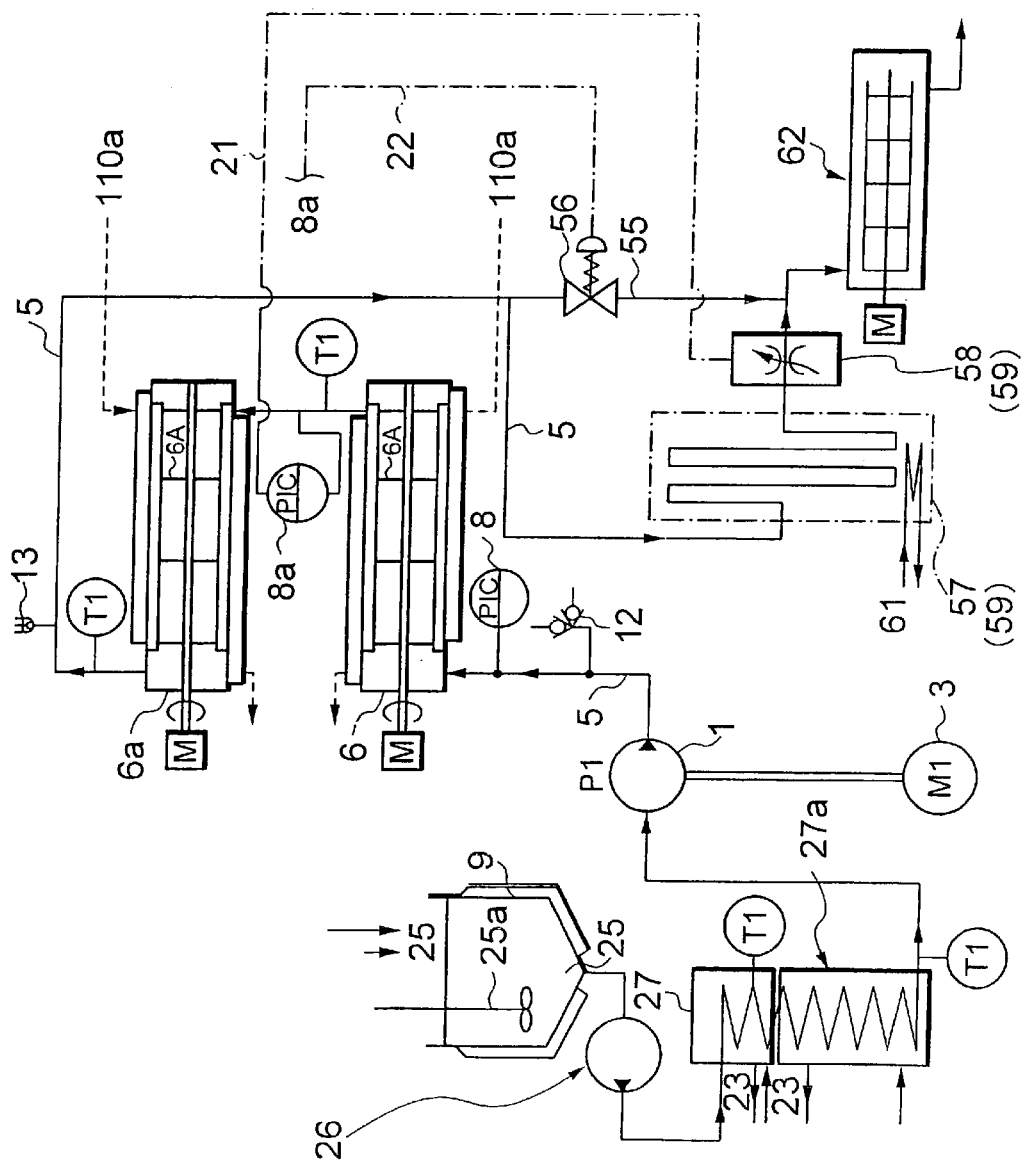
FIG. 10 is a block diagram of a continuous high-pressure processing apparatus according to a tenth embodiment of the present invention.

A tenth embodiment of the present invention shown in FIG. 10 will be described below. In FIG. 10, a liquid feedstock 25, which has a relatively high viscosity and comprises plural kinds of raw materials for foods, pharmaceuticals, cosmetics, etc. in the form of an oil-and-fat composition, for example, is introduced to a supply tank 9 along with other mixed materials or additives. The supply tank 9 is provided with an agitator 25a for agitating the feedstock 25. A pressurizing pump 1 is disposed downstream of the supply tank 9 and connected to it by a pipe through a low-pressure pump 26 and a plurality, two in FIG. 10, of temperature adjusting units 27, 27a that are arranged in series. The temperature adjusting units 27, 27a are coolers using coolants and include temperature indicators T1. The pressurizing pump 1 is constituted by, e.g., a plunger pump capable of delivering a high pressure, and is driven by a drive motor 3.

Downstream of the pressurizing pump 1, a plurality, two in FIG. 10, of processing container 6, 6a are arranged in series and interconnected by pipes (piping) 5. These first and second processing containers 6, 6a are provided with agitators 6A rotated by respective drive motors, and are constructed to be able to adjust temperatures in their inner spaces using coolants 110. A safety valve 12 is disposed between the pressurizing pump 1 and the first processing container 6. Also, pressure sensors 8, 8a are disposed on the inlet sides of the processing containers 6, 6a, and temperature indicators T1 are disposed on the outlet sides thereof.

A flow resistance 59 is disposed downstream of the second processing container 6a and is connected to it by pipes (piping) 5. The flow resistance 59 is constructed by coupling a zigzag line (line resistance) 57 immersed in cooling water 61, for example, and a throttle valve 58 having the adjusting function to each other in series. The zigzag line 57 is constructed by using a long pipe that has the same or a smaller diameter as or than the pipes 5, and shaping it into the zigzag form. Also, the zigzag line 57 is constructed to be able to adjust temperature using cold water, a coolant, hot water, or steam. Further, a pressure-release bypassing circuit 55 and an adjusting valve 56 are provided in parallel to the flow resistance 59. The adjusting valve 56 and the throttle valve 58 having the adjusting function are both connected to the pressure sensor 8a, which is disposed on the inlet side of the processing container 6a, so that they can be operated in accordance with a readout signal from the pressure sensor 8a. An air purge valve 13 is attached to the pipe 5 between the processing container 6a and the flow resistance 59. A cooling container 62 is disposed downstream of the flow resistance 59 and is connected to it by a pipe. The cooling container 62 is provided with an agitator rotated by a drive motor so that the feedstock 25 having been processed under high pressure is uniformly cooled. A shaping and packaging apparatus (not shown) for the processed and cooled feedstock 25 is disposed downstream of the cooling container 62 and connected to it.

The operation of this tenth embodiment having the above-described arrangement will be described below. When producing food made of an oil-and-fat composition, for example, edible oils and fats, listed below, and other raw materials are employed as the feedstock 25. The usable edible oils and fats are those ones usually employed in oil-and-fat processed products, e.g., natural oil (such as animal oil, vegetable oil and milk fat) and hydrogenated oil thereof, fractional oil, interesterification oil, and randomization oil in the sole or mixed form. These oils and fats are used either alone or as a W/O emulsion emulsified with water. Further, the feedstock may be mixed with other additives such as flavor ingredients, essences, nutrients, emulsifiers, viscosity improvers, and antioxidants. Those materials are introduced as the feedstock 25 to the supply tank 9 and are mixed under agitation for homogenization.

The feedstock 25 having been mixed homogeneously in the supply tank 9 is sucked by the low-pressure pump 6 and delivered to the pressurizing pump 1 through the temperature adjusting units 27, 27a. Until reaching the pressurizing pump 1, the temperature of the feedstock 25 is adjusted to a predetermined value by the temperature adjusting units 27, 27a. The temperature adjustment is performed in accordance with the readouts of the temperature indicators T1. The feedstock 25 is pressurized by the pressurizing pump 1 and then delivered to the processing containers 6, 6a under pressure. The feedstock 25 resides in the processing containers 6, 6a for a predetermined period of time during which the feedstock is kept cooled to a predetermined temperature under agitation while it is maintained in the state pressurized to a predetermined level of high pressure. The feedstock 25 is thereby subjected to processing such as sterilization and pressure crystallization. The processing is continuously carried out in the high-pressure state in the range of 10 MPa-150 MPa or at a level as high as several hundreds MPa depending on cases, while the feedstock 25 flows through the two (or more if necessary) processing containers 6, 6a successively. The predetermined level of high pressure is maintained by adjusting the opening degree of the throttle valve 58 having the adjusting function in accordance with the readout of the pressure sensor 8a. The predetermined temperature is maintained through adjustment using the readouts of the temperature indicators T1.

After residing in the processing containers 6, 6a for the predetermined period of time, the processed feedstock 25 is delivered from the processing containers 6, 6a and reaches the flow resistance 59 through the piping 5. In the flow resistance 59, the feedstock 25 is depressurized while passing through the line resistance 57 and the throttle valve 58 having the adjusting function. During the passage through the line resistance 57, the feedstock 25 is cooled or heater as required; e.g., if the viscosity is too high, it is heated. The feedstock 25 is slowly depressurized by the line resistance 57, but it is rapidly depressurized by the throttle valve 58 having the adjusting function. A temperature increase of the feedstock upon depressurization at the throttle valve 58 is cooled in the cooling container 62, whereby the continuous high-pressure processing is ended. The flow resistance 59 comprising the line resistance 57 and the throttle valve 58 having the adjusting function are not suitable for coping with, e.g., the emergent case where the pressure must be lowered down in a short time. The adjusting valve 56 in the bypassing circuit 55 is opened in any of those cases where a rapid pressure adjustment is required, the entire system is cleaned for replacement of the feedstock 25, or the pressure must be lowered down urgently upon an abrupt pressure increase. In the event of such an abnormal pressure increase as not being dealt with the opening of the adjusting valve 56, the safety valve 12 is opened.

In the above-described arrangement, the temperature adjusting units 27, 27a can be constructed so as to perform sterilization at high temperatures in one unit and to perform cooling in the other unit. The pressurizing pump 1 may be any of various types of pumps such as piston, plunger and gear pumps. The processing containers 6, 6a are each constructed to be able to adjust the agitating speed and the cooling temperature as needed depending on the state of the feedstock 25 during processing. The number of processing containers is not limited two as shown in FIG. 10, the system may comprise a single or three or more processing containers depending on the kind of the feedstock 25 or the processing conditions. While the throttle valve 58 is illustrated, by way of example, as a variable throttle valve in the above embodiment, it may be replaced by a nozzle, a pressure reducing valve, or a sequence valve. By employing, e.g., a valve of the type capable of automatically adjusting pressure with an electrical signal or pilot pressure, it is possible to realize automatic operation. A plurality of adjusting valves 56 may be arranged in parallel such that at least one of the adjusting valves 56 is used for adjustment of the opening degree and the other one(s) is used for the urgent on/off case. The pressure sensors 8, 8a can be disposed on the outlet sides of the processing containers 6, 6a or appropriate positions along the piping 5. The pressure signal for use in the pressure adjustment may be obtained from any of the pressure sensors 8, 8a.

Embodiment 11

Figure 11:
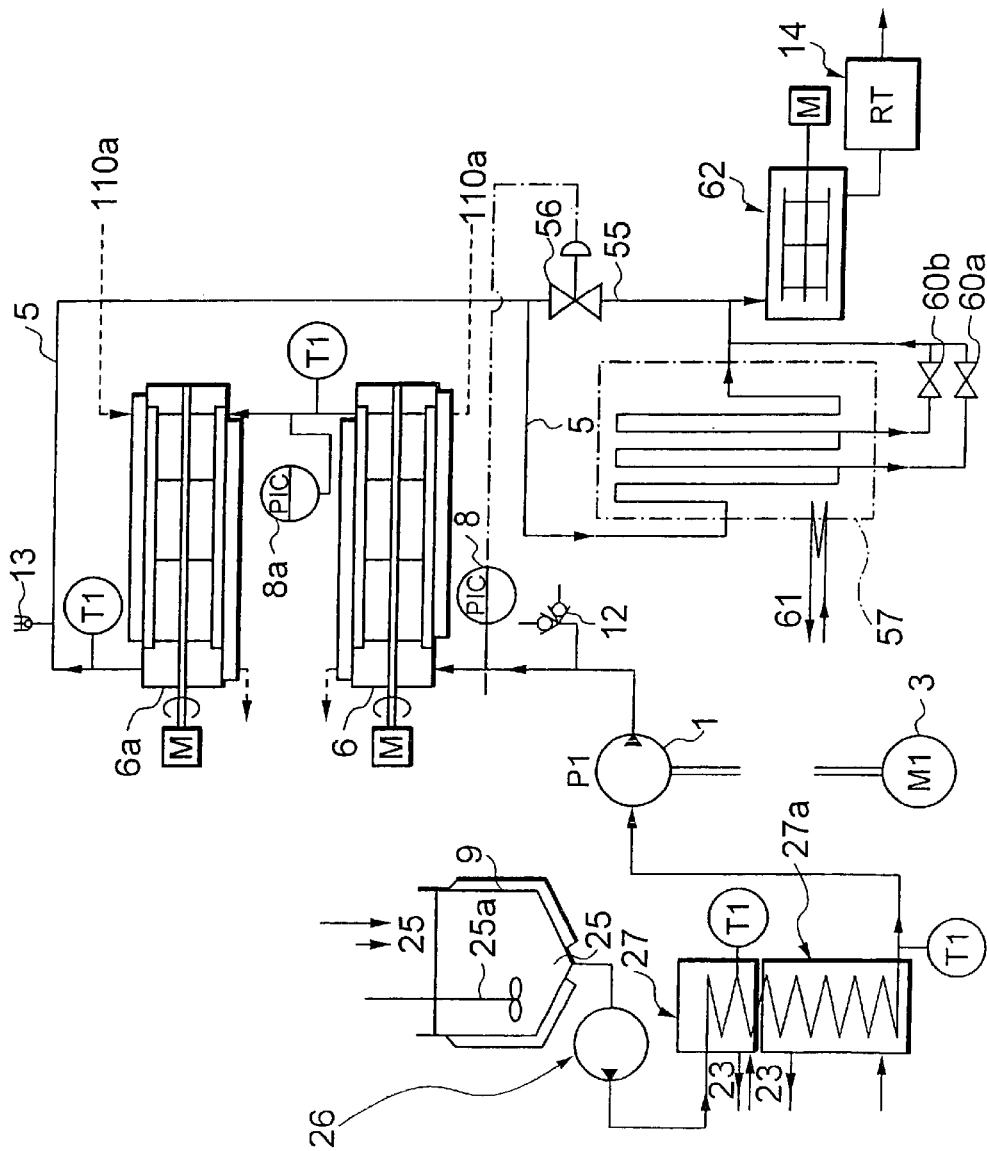
FIG. 11 is a block diagram of a continuous high-pressure processing apparatus according to an eleventh embodiment of the present invention.

An eleventh embodiment shown in FIG. 11 is the same as the tenth embodiment shown in FIG. 10 except for the flow resistance 59. Only the different arrangement will be described below. A line resistance 57 is disposed downstream of the second processing container 6a and is connected to it by pipes (piping) 5. The line resistance 57 is constructed by appropriately combining pipes that have the same or a smaller diameter as or than the pipes 5, and shaping a long pipe into the zigzag form. The zigzag pipe is shunted to the outlet at plural points (two in FIG. 11) in its intermediate portion, and valves 60a, 60b capable of being operated separately are disposed in the shunted paths. Also, the line resistance 57 is constructed to be able to adjust temperature using cold water, a coolant, hot water, or steam.

The operation of this eleventh embodiment having the above-described arrangement will be described below. After residing in the processing containers 6, 6a for the predetermined period of time, the processed feedstock 25 is delivered from the processing containers 6, 6a and reaches the line resistance 57 through the piping 5. The feedstock 25 is depressurized while passing through the line resistance 57. In the flow resistance 59, depending on the degree of depressurization required for the feedstock 25, the flow length of the feedstock 25 is selected to set a desired value of flow resistance by opening and closing the valves 60a, 60b in a properly combined manner. For example, by closing both the valves 60a, 60b in FIG. 11, a maximum resistance value is provided. Also, a minimum resistance value is provided by opening only the valve 60a on the upstream side, and a medium resistance value is provided by opening only the valve 60b on the downstream side. Further, by constructing each of the valves 60a, 60b to be able to adjust its opening degree, the resistance value can be continuously adjusted with combination of the respective opening degrees of both the valves. The feedstock 25 is cooled or heated as required; e.g., if the viscosity is too high, it is heated. Since the viscosity of the feedstock 25 is changed and a value of the flow resistance is controlled by cooling or heating the line resistance 57, the pressure adjustment of the entire system can be performed with the temperature adjustment of the line resistance 57. In addition, by detecting the line pressures upstream of the valves 60a, 60b and operating them in accordance with detected values so as to adjust the line pressures, it is possible to realize automatic operation.

Embodiment 12

Figure 12:
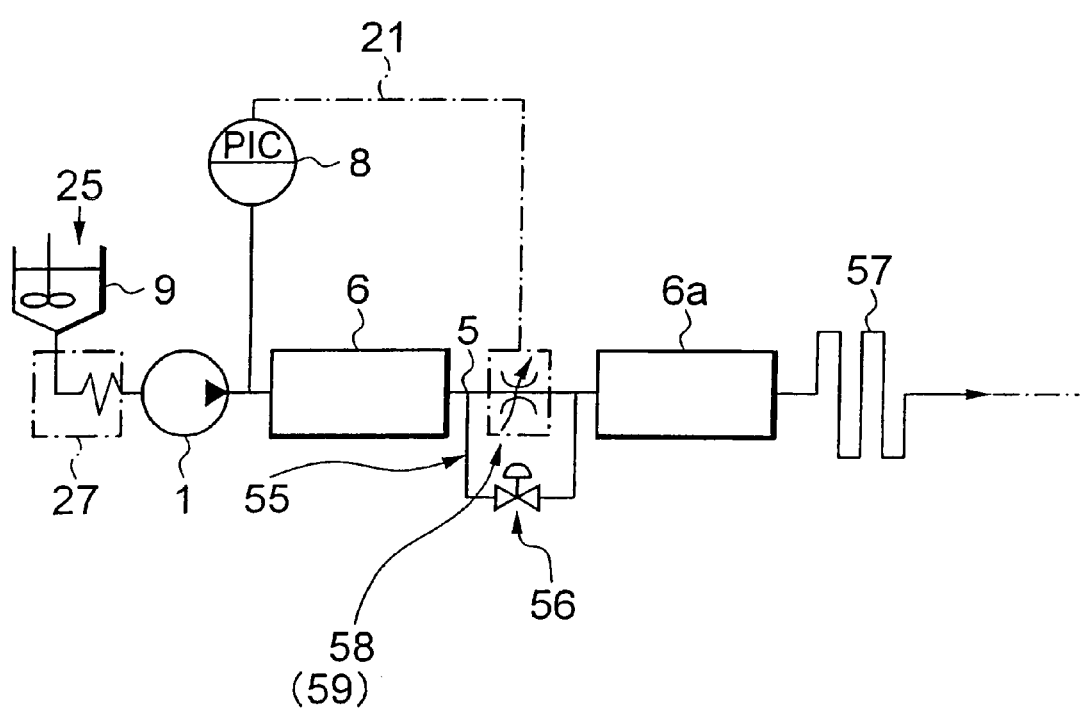
FIG. 12 is a block diagram of a continuous high-pressure processing apparatus according to a twelfth embodiment of the present invention.
Figure 13:
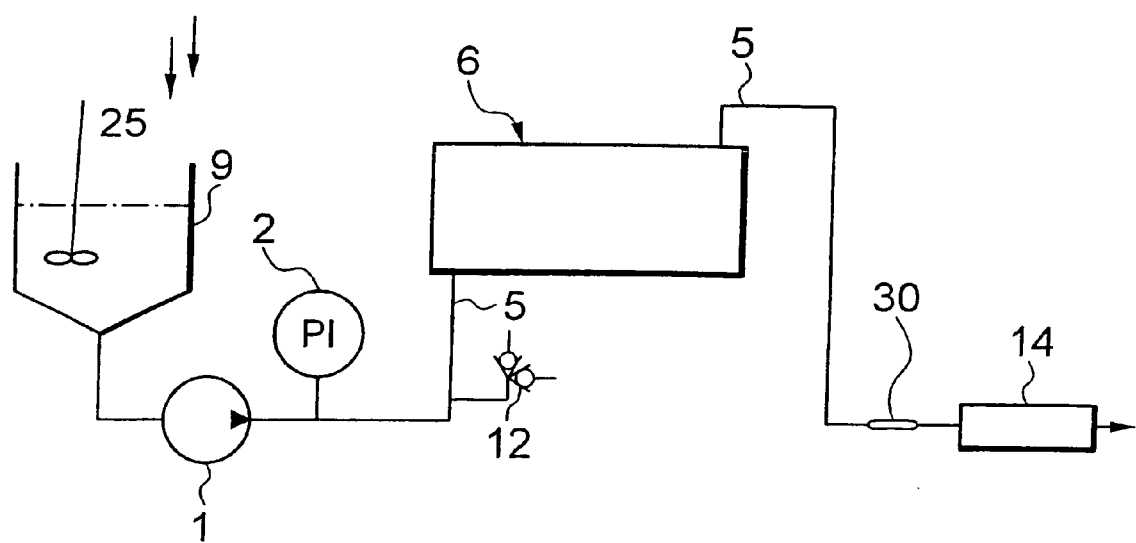
FIG. 13 is a block diagram showing one example of conventional continuous high-pressure processing apparatus.

FIG. 12 shows a twelfth embodiment of the present invention. Only the different arrangement from that of the tenth embodiment shown in FIG. 10 will be described below. The throttle valve 58 having the adjusting function, which constitutes the flow resistance 59 in the tenth embodiment, and the bypassing circuit 55 including the adjusting valve 56 are both disposed between the two processing containers 6 and 6a. With this arrangement, two steps of high-pressure processing can be performed while maintaining a desired residing time of the feedstock 25 in each processing container. Also, a large amount of heat is imposed on the feedstock 25 when it passes through the throttle valve 58 having the adjusting function, but the thus-heated feedstock 25 is cooled down in the subsequent processing container 6a. Accordingly, the cooling container 62 used in the tenth and eleventh embodiments can be dispensed with.

The above-described twelfth embodiment may be modified as follows depending on characteristics of the feedstock 25 to be processed. In the arrangement of FIG. 12, instead of the throttle valve 58 having the adjusting function, the line resistance 57 may be disposed only between the processing containers 6 and 6a. Also, while the line resistance 57 is constructed in the form of a zigzag pipe in the arrangement of FIG. 12, it may be formed of a linear pipe when the pipe length until the shaping and packaging apparatus of the subsequent stage is long.

INDUSTRIAL ADVANTAGES

The continuous high-pressure processing method and apparatus according to the present invention, which are constituted as shown in FIGS. 1 to 9, have the following advantages.

(1) The depressurizing pump is disposed at a downstream position of the piping that is connected at an upstream position to the pressurizing pump for pressurizing the feedstock fed through the piping, and the delivery rate of the pressurizing pump is set to be larger than that of the depressurizing pump. Therefore, a high pressure can be maintained in the piping and processing such as pressure crystallization can be continuously performed.

(2) A sealing portion of the depressurizing pump (motor) extends over several teeth or several steps when it is, for example, a gear pump. Therefore, the pressure is reduced progressively and components of the feedstock are changed to a lesser extent. Also, unlike the case of using a throttle for depressurization (through which all of the flow rate passes), a pressure release takes place upon part of the flow rate leaking through the sealing portion of the depressurizing pump, and hence a change of the components is reduced as a whole.

(3) In particular, pressure energy is recovered from the depressurizing pump and the recovered power can be used to operate the pressurizing pump. As a result, the overall power required for the main drive motor is reduced and saving of energy is promoted.

(4) Any desired section of the piping located between the pressurizing pump and the depressurizing pump can be brought into the state under high pressure, and only such a section of the piping requires to be constituted by equipment resistant against high pressure, whereas the remaining section can be designed using relatively inexpensive low-pressure equipment. The overall equipment cost is therefore cut down.

(5) A production line for an oil-and-fat composition is described above as one example, but the present invention is also applicable to a pressure crystallization line for other foods, pharmaceuticals, etc.

(6) There is no upper limit on the applied pressure, and the present invention is applicable to even a system brought into the state under several hundreds MPa.

(7) The present invention can also be applied to a line for sterilization under high pressure.

(8) Depressurizing energy produced by the depressurizing pump is taken out to the outside. Therefore, the feedstock is less heated and changes of the feedstock components are restrained.

The continuous high-pressure processing method and apparatus according to the present invention, which are constituted as shown in FIGS. 10 to 12, have the following advantages.

(1) Since a depressurizing section is constituted by the flow resistance, the number of moving parts is lessened and the pressure adjustment of the apparatus for processing a feedstock having a high viscosity can be more easily made.

(2) Correspondingly, the equipment cost of the apparatus can be cut down.
(3) Since the flow resistance is constituted by the line resistance, depressurization takes place slowly and heating of the feedstock is suppressed. As a result, changes in characteristics of the feedstock can be restrained.
(4) Since the cooling container is disposed downstream of the throttle valve having the adjusting function, heating of the feedstock can be cooled down at once and changes in characteristics of the feedstock can be more effectively restrained.
(5) Since part of the flow resistance is constituted by the throttle valve having the adjusting function, which is able to automatically control pressure, automatic operation of the apparatus can be realized.
(6) Since the bypassing circuit is disposed in parallel to the flow resistance, the pressure can be rapidly lowered down in the event of an abnormal pressure rise, and hence safety of the apparatus is secured.

What is claimed is:

1. A continuous high-pressure processing method comprising the steps of:
   supplying a feedstock continuously from a supply tank to a processing container through a pressurizing pump;
   discharging the processed feedstock from said processing container through a depressurizing pump disposed in piping; and
   setting a first delivery rate of said pressurizing pump to be larger than a second delivery rate of said depressurizing pump,
   whereby the interiors of said processing container and said piping are maintained in a high-pressure state.

2. A continuous high-pressure processing method according to claim 1, further comprising the step of coupling drive shafts of said pressurizing pump and said depressurizing pump to each other in a mechanically or electrically controllable manner.

3. A continuous high-pressure processing method according to claim 1, further comprising the steps of connecting said pressurizing pump and said depressurizing pump to a main drive motor and a driving distributor, providing a speed regulator in one downstream branch from said driving distributor, and setting a first driving speed of said pressurizing pump to be higher than a second driving speed of said depressurizing pump.

4. A continuous high-pressure processing method according to claim 1, further comprising the steps of connecting said pressurizing pump and said depressurizing pump to a main drive motor and a driving distributor, providing an auxiliary pressurizing pump, which has a smaller delivery rate than said pressurizing pump, in parallel to said pressurizing pump, and connecting a delivery portion of said auxiliary pressurizing pump to the outlet side of said pressurizing pump.

5. A continuous high-pressure processing method according to claim 1, further comprising the steps of connecting said pressurizing pump and said depressurizing pump to one main drive motor in series, providing an auxiliary pressurizing pump, which has a smaller delivery rate than said pressurizing pump, in association with said pressurizing pump, and connecting a delivery portion of said auxiliary pressurizing pump to the outlet side of said pressurizing pump.

6. A continuous high-pressure processing method according to claim 1, further comprising the steps of attaching a pressure sensor to said piping, and controlling the high-pressure state in accordance with a pressure signal from said pressure sensor.

7. A continuous high-pressure processing method according to claim 6, further comprising the steps of attaching a plurality of pressure sensors to said piping, and employing a pressure signal from any of said pressure sensors.

8. A continuous high-pressure processing method according to claim 1, further comprising the steps of connecting said pressurizing pump and said depressurizing pump to one main drive motor through a driving distributor, and constituting any of said pressurizing pump and said depressurizing pump to be of the variable displacement type.

9. A continuous high-pressure processing method according to claim 1, further comprising the steps of connecting said pressurizing pump to one main drive motor through a driving distributor, connecting any of said depressurizing pump and said pressurizing pump to said driving distributor through a gear box, and setting a gear ratio of said gear box such that delivery rates of both said pumps are in match with each other.

10. A continuous high-pressure processing method according to claim 1, further comprising the steps of driving said pressurizing pump by a main drive motor, driving said depressurizing pump by a second motor independent of said main drive motor, and supplying power from said second motor, as electrical energy, to said main drive motor.

11. A continuous high-pressure processing method according to claim 1, further comprising the step of heating or cooling said processing container.

12. A continuous high-pressure processing method according to claim 1, wherein said feedstock is any of foods and pharmaceuticals.

13. A continuous high-pressure processing method according to claim 1, further comprising the steps of driving said pressurizing pump by a main drive motor, driving said depressurizing pump by a second motor independent of said main drive motor, and recovering power from said second motor as electrical energy or saving the power for economy of energy.

14. A continuous high-pressure processing method according to claim 1, further comprising the step of providing a throttle valve and/or a line resistance in part of said piping, thereby reducing a load imposed on said depressurizing pump.

15. A continuous high-pressure processing apparatus comprising:
   a pressurizing pump for supplying a feedstock continuously from a supply tank to a processing container;
   a depressurizing pump disposed in piping downstream of said processing container; and
   control means for controlling delivery rates of both said pumps,
   said control means controlling a first delivery rate of said pressurizing pump to be larger than a second delivery rate of said depressurizing pump.

16. A continuous high-pressure processing apparatus according to claim 15, wherein said control means comprises a driving distributor connected between both said pumps and a main drive motor, and a speed regulating motor connected to said driving distributor.

17. A continuous high-pressure processing apparatus according to claim 15, wherein said control means comprises a driving distributor connected between said pressurizing pump and a main drive motor, said depressurizing pump being connected to said driving distributor, and an auxiliary pressurizing pump connected in parallel to said pressurizing pump and having a smaller delivery rate than said pressurizing pump, a delivery portion of said auxiliary pressurizing pump being connected to the outlet side of said pressurizing pump.

18. A continuous high-pressure processing apparatus according to claim 15, wherein said pressurizing pump and said depressurizing pump are connected in series to said main drive motor, and said control means comprises an auxiliary pressurizing pump connected in parallel to said pressurizing pump, a delivery portion of said auxiliary pressurizing pump being connected to the outlet side of said pressurizing pump.

19. A continuous high-pressure processing apparatus according to claim 15, wherein said control means comprises a driving distributor for connecting said pressurizing pump and said depressurizing pump to a main drive motor, any of said pumps being of the variable displacement type.

20. A continuous high-pressure processing apparatus according to claim 15, wherein said control means comprises a second motor for driving said depressurizing pump, said second motor being independent of a main drive motor for driving said pressurizing pump, and a control line for supplying power from said second motor, as electrical energy, to said main drive motor.

21. A continuous high-pressure processing apparatus according to claim 15, wherein said processing container includes heating means and/or cooling means.

22. A continuous high-pressure processing apparatus according to claim 15, further comprising a pressure sensor attached to said piping.

23. A continuous high-pressure processing apparatus according to claim 12, wherein said control means comprises a second motor for driving said depressurizing pump, said second motor being independent of a main drive motor for driving said pressurizing pump, and a control line and an amplifier for recovering power from said second motor as electrical energy or saving the power for economy of energy.

24. A continuous high-pressure processing method comprising the steps of:
  pressurizing a feedstock in a supply tank by a pressurizing pump and supplying the feedstock continuously to a processing container;
  discharging the processed feedstock continuously from said processing container through a flow resistance under depressurization, said flow resistance being able to adjust pressure; and
  providing a pressure-release bypassing circuit in parallel to said flow resistance,
  whereby the interior of said processing container is maintained in a state under a predetermined high pressure for continuous processing therein.

25. A continuous high-pressure processing method according to claim 24, further comprising the step of adjusting a temperature of said processing container to heat or cool the feedstock in said processing container.

26. A continuous high-pressure processing method according to claims 24, further comprising the step of cooling the processed feedstock in a cooling container downstream of said flow resistance.

27. A continuous high-pressure processing method according to claim 24, further comprising the steps of providing a plurality of processing containers connected to each other in series, and providing said flow resistance and said pressure-release bypassing circuit between said processing containers, whereby the interiors of said processing containers are maintained in states under high pressures changing step by step.

28. A continuous high-pressure processing method according to claim 24 further comprising the steps of providing said flow resistance in the form of a line designed to have a specific pipe length and/or pipe diameter, and switching on/off a plurality of valves disposed in said line to change the length of said line for changing a resistance value, whereby the interior of said processing container is maintained in a state under the predetermined high pressure.

29. A continuous high-pressure processing method according to claim 24, wherein said flow resistance is constituted as a throttle valve.

30. A continuous high-pressure processing method according to claim 24, further comprising the step of controlling a resistance value of said flow resistance in accordance with a pressure signal from a pressure sensor attached to said processing container or a piping connected to said processing container, whereby the interior of said processing container is maintained in a state under a predetermined high pressure.

31. A continuous high-pressure processing apparatus comprising:
  a supply tank for storing a feedstock and agitating the feedstock therein for homogenization;
  a pressurizing pump for sucking the feedstock in said supply pump and supplying the sucked feedstock continuously to a processing container under pressure;
  said processing container for holding the feedstock to reside therein in a high-pressure state for a predetermined period of time while the feedstock is agitated for homogenization;
  a flow resistance for discharging the processed feedstock continuously from said processing container under depressurization, said flow resistance being able to adjust pressure;
  a pressure-release bypassing circuit provided in parallel to said flow resistance; and
  piping connected to said processing container,
  whereby the interior of said processing container is maintained in a state under a predetermined high pressure for continuous processing therein.

32. A continuous high-pressure processing apparatus according to claim 31, wherein said processing container has the temperature adjusting function to heat or cool the feedstock in said processing container.

33. A continuous high-pressure processing apparatus according to claims 31, further comprising a cooling container downstream of said flow resistance to cool the processed feedstock.

34. A continuous high-pressure processing apparatus according to claim 31, wherein a plurality of processing containers are connected to each other in series, and said flow resistance and said pressure-release bypassing circuit are provided between said processing containers, whereby the interiors of said processing containers are maintained in states under high pressures changing step by step.

35. A continuous high-pressure processing apparatus according to claim 31, wherein said flow resistance comprises a line designed to have a specific pipe length and/or pipe diameter, and a plurality of valves disposed in said line, said valves being switched on/off to change a resistance value, whereby the interior of said processing container is maintained in a state under a predetermined high pressure.

36. A continuous high-pressure processing apparatus according to claim 31, wherein said flow resistance is constituted as a throttle valve.

37. A continuous high-pressure processing apparatus according to claim 31, further comprising a pressure sensor attached to said processing container, a resistance value of said flow resistance being controlled in accordance with a pressure signal from said pressure sensor, whereby the interior of said processing container is maintained in a state under a predetermined high pressure.

* * * * *